United States Patent
Goyal et al.

(10) Patent No.: US 12,133,525 B2
(45) Date of Patent: *Nov. 5, 2024

(54) AGRICULTURAL PESTICIDE COMPOSITIONS

(71) Applicant: SPECIALTY OPERATIONS FRANCE, Lyons (FR)

(72) Inventors: Rajesh Goyal, Gujarat (IN); Krish Shanmuga, Plainsboro, NJ (US)

(73) Assignee: SPECIALTY OPERATIONS FRANCE, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,636

(22) Filed: Jul. 20, 2022

(65) Prior Publication Data

US 2022/0361488 A1 Nov. 17, 2022

Related U.S. Application Data

(60) Continuation of application No. 15/414,771, filed on Jan. 25, 2017, now Pat. No. 11,419,330, which is a division of application No. 14/060,845, filed on Oct. 23, 2013, now abandoned.

(51) Int. Cl.
*A01N 25/24* (2006.01)
*A01N 25/06* (2006.01)
*A01N 57/12* (2006.01)

(52) U.S. Cl.
CPC .............. *A01N 25/24* (2013.01); *A01N 25/06* (2013.01); *A01N 57/12* (2013.01)

(58) Field of Classification Search
CPC ........ A01N 25/24; A01N 25/06; A01N 57/12; A01N 57/20; A01N 2300/00
See application file for complete search history.

(56) References Cited

U.S. PATENT DOCUMENTS

| | | | |
|---|---|---|---|
| 4,932,994 A | 6/1990 | Koester et al. | |
| 5,874,096 A | 2/1999 | Hazen | |
| 5,906,961 A | 5/1999 | Roberts et al. | |
| 6,214,771 B1 | 4/2001 | Dexter | |
| 7,977,278 B2 | 7/2011 | Vermeer et al. | |
| 2003/0104947 A1 | 6/2003 | Woznica et al. | |
| 2006/0063676 A1 | 3/2006 | Brigance et al. | |
| 2007/0161512 A1 | 7/2007 | Smith et al. | |
| 2010/0113275 A1 | 5/2010 | Bramati | |
| 2011/0301033 A1 | 12/2011 | Wilson et al. | |
| 2012/0231954 A1 | 9/2012 | Krapp et al. | |
| 2013/0123104 A1* | 5/2013 | McKnight | A01N 25/04 504/362 |
| 2013/0244878 A1* | 9/2013 | Goyal | A01N 25/30 504/206 |
| 2013/0252812 A1* | 9/2013 | Shao | A01N 25/00 514/786 |

FOREIGN PATENT DOCUMENTS

| | | |
|---|---|---|
| EP | 0598515 A1 | 5/1994 |
| JP | 48099087 A2 | 12/1973 |
| JP | 61122202 A | 6/1986 |
| JP | 04502915 A | 5/1992 |
| JP | 05112414 A | 5/1993 |
| JP | 06340509 A | 12/1994 |
| JP | 09124421 A | 5/1997 |
| JP | 2001151613 A | 6/2001 |
| JP | 2010518126 A | 5/2010 |
| JP | 2012507561 A | 3/2012 |
| WO | 199007272 A1 | 7/1990 |
| WO | 2006069791 A1 | 7/2006 |
| WO | 20008100896 A2 | 8/2008 |
| WO | 2010051435 A2 | 5/2010 |
| WO | 2012035015 A2 | 3/2012 |
| WO | 2012076567 A2 | 6/2012 |

OTHER PUBLICATIONS

"Choosing Noozles" webpage from HARDI website [online], retrieved from the internet on (Sep. 29, 2021) from URL <https://myhardi.com.au/index.php/shop/nozzle-guides/choosing-nozzles>, 7 pages.
Burghart, Markus, Lukas Schreiber, and Markus Riederer, "Enhancement of the Diffusion of Active Ingredients in Barley Leaf Cuticular Wax by Monodisperse Alcohol Ethoxylates", Journal of Agricultural and Food Chemistry 46.4 (1998), pp. 1593-1602.
Western, et al., "Drift reduction and droplet-size in sprays containing adjuvant oil emulsions", Pesticide Science, vol. 55, Issue 6, pp. 640-642, Jun. 1999.
Activator 90 product label [online], retrieved from the internet on (Apr. 1, 2019) from URL <https://www.agrian.com/labelcenter/results.cfm?quicksearch=ACTIVATOR%2090>, 1 page.
Oregon State University article entitled "Water quality affects herbicide efficacy", [online], (2012), retrieved from the internet on (Apr. 1, 2019) from URL <https://web.archive.org/web20120207074113/http://oregonstate.edu/dept/nursery-weeds/feature_articles/spray_tank/spray_tank.htm>.

* cited by examiner

*Primary Examiner* — Adam C Milligan
*Assistant Examiner* — Amanda Michelle Petritsch
(74) *Attorney, Agent, or Firm* — Vorys, Sater, Seymour and Pease LLP; Anthony P. Venturino; Maryellen Feehery Hank

(57) ABSTRACT

An adjuvant composition for modifying the spray properties of an aqueous pesticide composition contains (a) at least one fatty deposition control agent, and (b)(ii) a liquid medium, one or more hydrotropes, and, optionally one or more surfactants, or (b)(ii) one or more surfactants, and adjuvant compositions for modifying the spray properties of an aqueous pesticide composition contains (c) at least one deposition control agent, and (d)(ii) a liquid medium, one or more hydrotropes, and, optionally one or more surfactants, or (d)(ii) one or more surfactants, and use thereof in agricultural applications.

11 Claims, No Drawings

AGRICULTURAL PESTICIDE COMPOSITIONS

CROSS REFERENCE TO RELATED APPLICATIONS

This application is a continuation of U.S. application Ser. No. 15/414,771, filed Jan. 25, 2017, hereby incorporated by reference, which is a divisional application of U.S. application Ser. No. 14/060,845, filed Oct. 23, 2013, hereby incorporated by reference, which claims the benefit of U.S. Provisional Application No. 61/717,188 filed Oct. 23, 2012, as well as U.S. Provisional Application No. 61/862,152 filed Aug. 5, 2013, both herein incorporated by reference.

FIELD OF THE INVENTION

This invention relates to agricultural pesticide compositions and, in particular, to agricultural pesticide compositions containing deposition control agents.

BACKGROUND OF THE INVENTION

Many agricultural pesticides, including insecticides, fungicides, herbicides, miticides, and plant growth regulators, are applied in the form of a liquid composition. In addition to the pesticide, such liquid compositions typically include one or more adjuvant compounds intended to improve one or more properties of the liquid composition, such as for example, storage stability, ease of handling, deposition of the active ingredient on the target and/or pesticide efficacy against target organisms.

SUMMARY OF THE INVENTION

In order to improve the deposition of the active ingredient on the target, and thereby in order to improve the efficacy of the spraying, the use of deposition control agents is known. Deposition control agents include drift control agents, anti-bouncing agents, anti-splashing agents, anti-leaching agents, anti-misting agents, anti-roll off agents, and combinations thereof.

Drift control agents are additives that, typically through control of droplet size, render spray droplets less susceptible to being blown off-target and missing a target area. Anti-bouncing agents (also known as anti-rebound agents) are additives that render the spray droplets less susceptible to bouncing, rebounding, or splashing when the droplet hits a target surface, for example a leaf, and thus reducing loss of active ingredient to the ground, Anti-leaching agents (also known as rain-fastness agents) are additives that, after deposition of droplets onto a target surface, render the spray droplets less susceptible to removal from the target surface by rain or wind and/or allowing a long lasting effect of the active. In each case, the deposition control agent improves efficiency and permits a reduction of the amount of active ingredient used, which in turn reduces economic and environmental concerns. Anti-roll off agents, also known as sticking agents, are additives that render spray droplets less susceptible to rolling off or falling off the target surface.

There is a continuing interest in developing adjuvants for improved deposition control, e.g., controlling drift of spray applied pesticides or controlling rebound or roll-off of spray applied pesticides, that exhibit high performance when present in a spray composition in low amount and that are relatively insensitive to the amount of adjuvant in the spray composition.

In a first aspect, the present invention is directed to an adjuvant composition for modifying the spray properties of an aqueous pesticide composition, comprising:

(a) at least one fatty deposition control agent, and (b)(i) a liquid medium, one or more hydrotropes, and, optionally one or more surfactants, or (b)(ii) one or more surfactants, optionally, one or more hydrotropes or a liquid medium.

The adjuvant composition is capable of forming a stable emulsion upon dilution into an aqueous solution. The adjuvant composition, in one embodiment, comprises at least one fatty deposition control agent and at least one surfactant. The surfactant can be any suitable surfactant, which includes but is not limited to polyalkoxylated triglycerides, fatty acid glycol ester surfactants, or a combination thereof. The fatty deposition control agent can, in another embodiment, comprise one or more fatty alkanes, fatty amines, fatty acids, fatty amides, fatty glycerides, fatty triglycerides, fatty acid esters, or a mixture thereof. The fatty deposition control agent can, in another embodiment, comprise one or more fatty alkanes, fatty amines, fatty acids, fatty glycerides, or mixtures thereof In one particular embodiment, the adjuvant composition comprises: (a) at least one fatty deposition control agent that comprises one or more fatty acids, and (b)(ii) at least one surfactant. The fatty acid can comprises oleic acid, linoleic acid, tall oil fatty acid or mixtures thereof.

In another embodiment, the adjuvant composition comprises (a) at least one fatty deposition control agent comprises one or more fatty acids, and (b)(ii) the at least one surfactant comprises a polyalkoxylated triglyceride.

In another embodiment, the adjuvant composition comprises: (a) at least one fatty deposition control agent that comprises one or more fatty triglycerides, and (b)(ii) at least one surfactant that comprises polyalkoxylated triglycerides, fatty acid glycol ester surfactants, or a combination thereof. In one embodiment, the one or more fatty triglycerides is present in an amount ranging from 70% to 99% by weight of composition. In another one embodiment, the one or more fatty triglycerides is present in an amount ranging from 60% to 90% by weight of composition, or in another embodiment present in an amount ranging from 65% to 98% by weight of composition, or in another embodiment present in an amount ranging from 65% to 80% by weight of composition.

In one embodiment, the adjuvant composition comprises: (a) at least one fatty deposition control agent comprising one or more fatty acid esters and (b)(ii) one or more surfactants selected from alkoxylated alcohol surfactants. In one particular embodiment, the fatty acid ester is a methyl ester of lauric acid.

In one embodiment, the fatty deposition control agent is a fatty drift control agent and/or a fatty anti-rebound agent and/or a fatty anti-roll off agent.

In another aspect, described herein are concentrated pesticide compositions, comprising:

a liquid medium, one or more pesticide compounds, and at least one fatty deposition control agent, in an amount that is effective when the concentrated pesticide composition is diluted and spray applied, to provide improved deposition control compared to an analogous diluted and spray applied pesticide composition that lacks the at least one fatty deposition control agent. In one embodiment, the concentrated pesticide composition is a homogenous liquid. In another embodiment, the concentrated pesticide composition forms a stable emulsion upon dilution with water. Generally, problems arise if the concentrated pesticide composition does not form a stable emulsion or maintain homogeneity when diluted in water (typically the spray solution). For example, the spray solution or diluted pesticide concentrate, if unable to form a stable emulsion or maintain homogeneity, becomes unusable and cannot be spray applied (e.g., clogs up the lines from the spray tank to the nozzle, clogs up the nozzle).

Optionally, the concentrated pesticide composition includes at least one surfactant. In one embodiment, the fatty deposition control agent is a fatty drift control agent and/or a fatty anti-rebound agent and/or a fatty anti-roll off agent.

In one embodiment, where the fatty deposition control agent is a fatty acid, the concentrated pesticide composition is free of surfactant. In one embodiment, "free of surfactant" means completely free or substantially free of surfactant, i.e., where there may be trace amounts of surfactant present.

In another aspect, the present invention is directed to an end use pesticide composition, comprising:
water,
one or more pesticide compounds, and
at least one fatty deposition control agent, in an amount effective as a deposition control agent.

In one embodiment, the end use pesticide composition includes at least one surfactant. In another embodiment, the at least one fatty deposition control agent is one or more fatty acids. In another embodiment, the at least one fatty deposition control agent is one or more fatty triglycerides, and wherein the at least one surfactant is present and is selected from polyalkoxylated triglycerides, fatty acid glycol ester surfactants, or a combination thereof. The one or more fatty triglycerides or one or more fatty acids can be present in an amount ranging from 0.001% to 5% by weight of composition, or in other embodiments present in an amount ranging from 0.01% to 4% by weight of composition, or present in an amount ranging from 0.01% to 3% by weight of composition, or present in an amount ranging from 0.01% to 2% by weight of composition. In one embodiment, the one or more fatty triglycerides or one or more fatty acids can be present in an amount ranging from 0.01% to 1% by weight of composition.

In one embodiment the fatty deposition control agent is a fatty drift control agent. In another embodiment, the fatty deposition control agent is a fatty anti-rebound agent. In another embodiment, the fatty deposition control agent is a fatty anti-roll off agent.

In a further aspect, the present invention is directed to a method for controlling deposition of an aqueous pesticide composition that comprises one or more pesticide compounds and water, said method comprising: incorporating in the aqueous pesticide composition, in an amount effective as a deposition control agent, at least one fatty deposition control agent, and spray applying the aqueous pesticide composition and deposition control agent to a target pest and/or to the environment of the target pest, wherein the spray applied aqueous pesticide composition exhibits improved deposition control compared to an analogous spray applied aqueous pesticide composition that lacks the at least one fatty deposition control agent. In one embodiment, the fatty deposition control agent is a fatty drift control agent. In another embodiment, the fatty deposition control agent is a fatty anti-rebound agent. In another embodiment, the fatty deposition control agent is a fatty anti-roll off agent.

In yet another aspect, described herein are methods for improving deposition control of an aqueous pesticide composition during a spray application, comprising:
contacting an aqueous pesticide composition with an adjuvant composition, wherein the adjuvant composition comprises:
(a) at least one fatty deposition control agent, and
(b)(ii) a liquid medium, one or more hydrotropes, and, optionally one or more surfactants, or
(b)(ii) one or more surfactants, optionally, one or more hydrotropes or a liquid medium,
and wherein the adjuvant composition forms a stable emulsion upon dilution into the pesticide composition; and
spray applying the aqueous pesticide composition and adjuvant composition to a target pest and/or to the environment of the target pest,
wherein the spray applied aqueous pesticide composition exhibits improved deposition control compared to an analogous spray applied aqueous pesticide composition that lacks the adjuvant composition.

In one embodiment, the adjuvant composition comprises at least one fatty deposition control agent and at least one surfactant. In another embodiment, the fatty deposition control agent can comprise one or more fatty acids. When the fatty deposition control agent is a fatty acid, in one embodiment, the fatty acid comprises oleic acid, linoleic acid, tall oil fatty acid or mixtures thereof.

In another aspect, described herein are methods for improving deposition control of an aqueous pesticide composition during a spray application, comprising:
contacting a concentrated pesticide composition with an aqueous spray solution, wherein the concentrated pesticide composition forms a stable emulsion upon dilution with water,
wherein the concentrated pesticide composition comprises:
an aqueous liquid medium,
one or more pesticide compounds, and
at least one fatty deposition control agent in an amount that is effective, when the concentrated pesticide composition is diluted and spray applied, to provide improved deposition control compared to an analogous diluted and spray applied pesticide composition that lacks the at least one fatty deposition control agent, and
spray applying the aqueous pesticide composition to a target pest and/or to the environment of the target pest.

In one embodiment, the spray applied aqueous pesticide composition exhibits improved drift control properties compared to an analogous spray applied aqueous pesticide composition that lacks the at least one fatty deposition control agent. In another embodiment, the spray applied aqueous pesticide composition exhibits improved anti-rebound properties compared to an analogous spray applied aqueous pesticide composition that lacks the at least one fatty deposition control agent.

In one embodiment, the fatty deposition control agent comprises one or more fatty acids. In another embodiment, the fatty deposition control agent comprises one or more fatty triglycerides.

A spray applied aqueous pesticide composition that comprises an effective amount of the fatty deposition control agent as described herein exhibits improved deposition control (e.g, improved drift control or improved anti-rebound).

Where the fatty deposition control agent is a fatty drift control agent, the spray applied aqueous pesticide composition typically exhibits a smaller amount of small size droplets that are very susceptible to spray drift, for example, droplets of less than about 150 microns ("μm") in size, compared to an analogous spray applied aqueous pesticide composition that lacks the at least one fatty drift control agent. This improvement typically results in a spray droplet distribution that is more focused within the desirable range of from 150 microns ("μm") to 500 μm in size. The drift control performance of the composition comprising the fatty drift control agent is less sensitive to concentration than a high molecular weight polymeric drift control agent and has a less dramatic effect on the viscosity of the pesticide composition than a high molecular weight polymeric drift control agent.

In another aspect, the present invention is directed to a concentrated pesticide composition, comprising:

a liquid medium, one or more pesticide compounds, and at least one fatty deposition control agent, in an amount that is effective when the concentrated pesticide composition is diluted and spray applied, to provide improved deposition control properties compared to an analogous diluted and spray applied pesticide composition that lacks the at least one fatty deposition control agent. In one embodiment, the fatty deposition control agent is a fatty drift control agent and/or a fatty anti-rebound agent and/or a fatty anti-roll off agent. The compositions or methods described herein can optionally comprise at least one surfactant.

DETAILED DESCRIPTION OF INVENTION

As used herein, the term "alkyl" means a saturated straight chain, branched chain or cyclic hydrocarbon radical, such as for example, methyl, ethyl, n-propyl, iso-propyl, n-butyl, sec-butyl, t-butyl, pentyl, n-hexyl, cyclohexyl, which, in the case of cyclic alkyl groups, may be further substituted on one or more carbon atoms of the ring with a straight chain or branched alkyl group and wherein any two of such substituents may be fused to form a polyalkylene group that bridges the two ring carbon atoms to which they are attached.

As used herein, the term "alkoxyl" means an oxy group substituted with an alkyl group, such as, for example, methoxyl, ethyoxyl, propoxyl.

As used herein, the term "hydroxyalkyl" means a saturated straight chain or branched chain hydrocarbon radical substituted one or more carbon atoms with a hydroxyl group, such as for example, hydroxymethyl, hydroxyethyl, hydroxypropyl.

As used herein, the term "alkenyl" means an unsaturated straight chain, branched chain, or cyclic hydrocarbon radical that contains one or more carbon-carbon double bonds, such as, for example, ethenyl, 1-propenyl, and 2-propenyl, cyclohexenyl, which, in the case of cyclic alkenyl groups, may be further substituted on one or more carbon atoms of the ring with a straight chain or branched alkyl group and wherein any two of such substituents may be fused to form a polyalkylene group that bridges the two ring carbon atoms to which they are attached.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl, and tristyrylphenyl.

As used herein, the term "aralkyl" means an alkyl group substituted with one or more aryl groups, such as, for example, phenylmethyl, phenylethyl, and triphenylmethyl.

As used herein, the term "alkaryl" means an aryl group substituted with one or more alkyl groups, such as, for example, methylphenyl, and ethylphenyl.

As used herein, the term "alkylamido" means amido radical, substituted with an alkyl group, such as dodecylamido, tetradecylamido n,n-dialkylalkylamide n,n-dimethyl octanamide, n,n-dimethyldecanamide, n,n-dimethyl dodecanamide, n,n-dimethyl tetradecanamide.

As used herein, the terminology "($C_m$-$C_n$)" in reference to an organic group, wherein m and n are each integers, indicates that the group may contain from m carbon atoms to n carbon atoms per group.

As used herein, the term "agronomically acceptable salts" refers to salts prepared from agronomically acceptable non-toxic bases or acids including inorganic or organic bases and inorganic or organic acids. Typical agronomically acceptable salts the compound referred to herein comprise an anion derived from the compound, for example, by deprotonation of a hydroxy or hydroxyalkyl substituent, and one or more positively charged counterions. Suitable positively charged counterions include inorganic cations and organic cations, such as for example, sodium cations, potassium cations, calcium cations, magnesium cations, isopropylamine cations, ammonium cations, and tetraalkylammonium cations.

As used herein, the terminology "end use pesticide composition" means an aqueous pesticide composition that contains pesticide in amount effective to control a target pest, such as, for example, a target plant, fungus, bacterium, or insect, when the end use pesticide composition is applied, typically in the form of an spray, to the pest and/or to the environment of the pest at a given application rate and the terminology "concentrated pesticide composition" means a composition that contains a relatively high concentration of pesticide that is suitable to be diluted with water to form an end use pesticide composition.

As used herein, the terminology "effective amount" in reference to the relative amount of a pesticide in a pesticide composition means the relative amount of pesticide that is effective to control a target pest, for example, a target plant, fungus, bacterium, or insect, when the pesticide composition is applied to the pest and/or to the environment of the pest at a given application rate and the terminology "herbicidally effective amount" in reference to the relative amount of herbicide in an herbicidal composition means the relative amount that is effective to control growth of a target plant when the herbicidal composition is spray applied to the target plant and/or to the environment of the plant at a given application rate.

As used herein, the term "drift" refers to off-target movement of droplets of a pesticide composition that is applied to a target pest or environment for the pest. Spray applied compositions typically exhibit decreasing tendency to drift with decreasing relative amount, typically expressed as a volume percentage of total spray applied droplet volume, of small size spray droplets, that is, spray droplets having a droplet size below a given value, typically, a droplet size of less than 150 micrometers ("μm"). Spray drift of pesticides can have undesirable consequences, such as for example, unintended contact of phytotoxic pesticides with non-pest plants, such as crops or ornamental plants, with damage to such non-pest plants.

As used herein, the term "anti-rebound agent(s)" refers to one or more additives and/or compositions that render spray droplets less susceptible to bouncing, rebounding, roll-off or splashing of the droplet when the droplet hits a target surface, for example a leaf. Bouncing, rebounding, roll-off or splashing of the droplet when the droplet hits a target surface may lead to the loss of active ingredient to the ground, lowering efficacy of an applied spray formulation.

As used herein, the terminology "an amount effective" in reference to the fatty drift control agent as described herein means an amount of such fatty drift control agent that, when added to a given aqueous pesticide composition and the combined aqueous pesticide composition and fatty drift control agent is spray applied, is effective to reduce spray drift of the spray applied composition. Typically, the ability of a given amount of fatty drift control agent to reduce spray drift of a spray applied composition is evaluated by spray applying, under the same spray conditions, a pesticide composition that contains the given amount of the fatty drift control agent and an analogous pesticide composition that lacks the fatty drift control agent and then comparing the relative amount of small size spray droplets exhibited by spray applied compositions, with a reduction in the amount of small size spray droplets being indicative of the ability to reduce spray drift of the spray applied composition.

As used herein, the terminology "an amount effective" in reference to the fatty anti-rebound agent as described herein means an amount of such fatty anti-rebound agent that, when added to a given aqueous pesticide composition and the combined aqueous pesticide composition and fatty anti-rebound agent is spray applied, is effective to improve anti-rebound properties of the spray applied composition.

As used herein, the terminology "an amount effective" in reference to the fatty deposition control agent as described herein means an amount of such fatty deposition control agent that, when added to a given aqueous pesticide composition and the combined aqueous pesticide composition and fatty deposition control agent is spray applied, is effective to improve the deposition control properties of the spray applied composition.

As used herein, "liquid medium" means a medium that is in the liquid phase at a temperature of 25° C. and a pressure of one atmosphere. The liquid medium may be a non-aqueous liquid medium or an aqueous liquid medium.

In one embodiment, the liquid medium is a non-aqueous liquid medium. As used herein, the terminology "non-aqueous medium" means a single phase liquid medium that contains no more that trace amounts of water, typically, based on 100 parts by weight ("pbw") of the non-aqueous medium, no more than 0.1 pbw water. Suitable non-aqueous liquid media include organic liquids, including non-polar organic liquids, such as benzene, chloroform, and diethyl ether, polar aprotic organic liquids, such as dichloromethane, ethyl acetate, acetone, and tetrahydrofuran, and polar protic organic liquids, such as ($C_1$-$C_3$)alkanols and ($C_1$-$C_3$) polyols, such as methanol, ethanol, and propanol, glycerol, ethylene glycol, propylene glycol, diethylene glycol, poly (ethylene glycol)s, ethylene glycol monobutyl ether, dipropylene glycol methyl ether, and ethylene glycol phenyl ether, as well as mixtures of such liquids. In one embodiment, the non-aqueous medium comprises an organic liquid that is not miscible with water (a "water immiscible organic liquid").

In one embodiment, the liquid medium is an aqueous liquid medium. As used herein, the terminology "aqueous medium" means a single phase liquid medium that contains more than a trace amount of water, typically, based on 100 pbw of the aqueous medium, more than 0.1 pbw water. Suitable aqueous media more typically comprise, based on 100 pbw of the aqueous medium, greater than about 5 pbw water, even more typically greater than 10 pbw water. In one embodiment, the aqueous medium comprises, based on 100 pbw of the aqueous medium, greater than 40 pbw water, more typically, greater than 50 pbw water. The aqueous medium may, optionally, further comprise water soluble or water miscible components dissolved in the aqueous medium. The terminology "water miscible" as used herein means miscible in all proportions with water. Suitable water miscible organic liquids include, for example, ($C_1$-$C_3$)alcohols, such as methanol, ethanol, and propanol, and ($C_1$-$C_3$) polyols, such as glycerol, ethylene glycol, and propylene glycol. The composition as described herein may, optionally, further comprise one or more water insoluble or water immiscible components, such as a water immiscible organic liquid, wherein the combined aqueous medium and water insoluble or water immiscible components form a micro emulsion, or a multi-phase system such as, for example, an emulsion, a suspension or a suspo-emulsion, in which the aqueous medium is in the form of a discontinuous phase dispersed in a continuous phase of the water insoluble or water immiscible component, or, more typically, the water insoluble or water immiscible component is in the form of a discontinuous phase dispersed in a continuous phase of the aqueous medium.

Fatty compounds suitable as the fatty deposition control agent as described herein are typically insoluble in water and form a two phase mixture with water in all proportions.

In one embodiment, the fatty deposition control agent comprises one or more fatty alkanes, fatty acids, fatty amines, fatty amides, fatty glycerides, fatty triglycerides, fatty acid esters, or any mixture thereof. In another embodiment, the fatty deposition control agent comprises one or more fatty alkanes, fatty acids, fatty amides, fatty glycerides, or any mixture thereof. For example, the fatty deposition control agent, in one embodiment, is a mixture of a fatty acid and a fatty triglyceride. In another embodiment, the fatty deposition control agent comprises one or more fatty alkanes. In another embodiment, the fatty deposition control agent comprises one or more fatty acids. In another embodiment, the fatty deposition control agent comprises one or more fatty glycerides. In another embodiment, the fatty deposition control agent comprises one or more fatty triglycerides. In another embodiment, the fatty deposition control agent comprises one or more fatty acid esters. In another embodiment, the fatty deposition control agent comprises one or more fatty amines. In another embodiment, the fatty deposition control agent comprises one or more fatty amides.

In one embodiment, the fatty deposition control agent is a fatty drift control agent. In another embodiment, the fatty deposition control agent is a fatty anti-rebound agent.

In one embodiment, the fatty deposition control agent as described herein comprises one or more fatty alkanes, fatty amines, fatty acids, and/or fatty amides according to structure (I):

$$R^1\text{-}(A)_n \qquad (I)$$

wherein:
R$^1$ is a ($C_4$-$C_{30}$)hydrocarbon group, which may optionally be substituted on one or more carbon atoms with A, provided that, if R$^1$ is a ($C_4$)hydrocarbon group, then n cannot be 0,
each A is independently, —N(R$^2$)R$^3$, —COOH, or —CON(R$^4$)R$^5$,
R$^2$, R$^3$ are each independently H, hydroxyl, or ($C_1$-$C_6$) alkyl, provided that at least one of R$^2$ and R$^3$ is H or ($C_1$-$C_6$)alkyl, $R^4$, and $R^5$ are each independently H or $(C_1-C_6)$alkyl, and n is 0, 1, 2, or 3, and including, if A is —$N(R^2)R^3$, or —COOH, salts thereof.

In one embodiment, the fatty deposition control agent as described herein comprises one or more fatty alkanes according to structure (I), wherein $R^1$ is linear or branched $(C_5-C_{30})$alkane, more typically, linear or branched $(C_8-C_{24})$ alkane, even more typically linear or branched $(C_{12}-C_{22})$ alkane, or $(C_5-C_{24})$cycloalkane, and n is 0.

Suitable fatty alkane deposition control agents include, for example, $(C_5-C_{30})$alkanes, such as pentane, hexane, heptane, octane, nonane, decane, undecane, dodecane, tetradecane, pentadecane, hexadecane, heptadecane, octadecane, nonadecane, docosane, hexacosene, octacosene, and triacontane, ethylhexane, cyclohexane, cyclooctane, and cyclodecane, as well as mixtures thereof.

In one embodiment, $R^1$ is linear or branched $(C_4-C_{30})$ alkyl, more typically $(C_8-C_{24})$alkyl, $(C_6-C_{12})$cycloalkyl, linear or branched $(C_4-C_{30})$alkenyl, more typically $(C_8-C_{24})$ alkenyl, $(C_8-C_{30})$alkaryl, or $(C_8-C_{30})$aralkyl, and n is 1, 2, or 3, wherein the alkenyl groups may be monounsaturated or polyunsaturated. In one embodiment, $R^1$ is linear or branched $(C_4-C_{30})$alkyl; or in another embodiment is a linear or branched $(C_8-C_{24})$alkyl; or in another embodiment is a linear or branched $(C_{12}-C_{22})$alkyl; or in another embodiment is a $(C_5-C_{24})$cycloalkyl; or in another embodiment is a linear or branched $(C_4-C_{30})$alkenyl; or in another embodiment is a linear or branched $(C_8-C_{24})$alkenyl; or in another embodiment is a linear or branched $(C_{12}-C_{22})$alkenyl; or in another embodiment is a $(C_5-C_{24})$cycloalkenyl; or in another embodiment is a $(C_4-C_{30})$alkaryl; or in another embodiment is a $(C_8-C_{24})$alkaryl, or $(C_4-C_{30})$aralkyl, more typically $(C_8-C_{24})$aralkyl.

Alkyl groups suitable as the $R^1$ substituent of the compound of formula (I) include, for example, pentyl, hexyl, dimethylbutyl, heptyl, methylhexyl, octyl, ethylhexyl, nonyl, decyl, undecyl, dodecyl, tetradecyl, pentadecyl, hexadecyl, ethyltetradecyl, heptadecyl, octadecyl, nonadecyl, docosyl, hexacosyl, octacosyl, triacontyl, cyclohexyl, cyclooctyl, and cyclodecyl.

Alkenyl groups suitable as the $R^1$ substituent of the compound of formula (I) include, for example, cis-9-hexadecenyl, all cis-7,10,13-hexadecatrienyl, cis-6-octadecenyl, trans-6-octadecenyl, cis-7-octadecenyl, cis-9-octadecenyl, trans-9-octadecenyl, cis-11-octadecenyl trans-11-octadecenyl, cis-12-octadecenyl, cis, cis-9,12-octadecedienyl, trans-9,12-octadecedienyl, all cis-6,9,12-octadecatrienyl, all cis-9,12,15-octadecatrienyl, all cis-6,9,12,15,-octadecatetraenyl, cis-11-eicosenyl, cis, cis-11,14-eicosadienyl, all cis-11,14,17-eicosatrienyl all cis-5,8,11,14-eicosatetraenyl, all cis-8,11,14,17-eicosatetraenyl, all cis-5,8,11,14,17-eicosapentaenyl, cis-13-docosenyl, cis, cis-13,16-docosadienyl, all cis-6,9,12-octadecatrienyl, all cis-7,10,13,16-docosatetraenyl, all cis-7,10,13,16,19-docosapentaenyl, all cis-4,7,10,13,16,19-docosahexaenyl, cis-15-tetracosenyl, all cis-9,12,15,18,21-tetracosapentaenyl, or all cis-6,9,12,15,18,21-tetracosahexaenyl.

In embodiments where A is —$N(R^2)R^3$, suitable salts are those having an anionic counterion, $X^-$, including salts of inorganic acids, such as halide salts, and salts of organic acids, such as $(C_1-C_{30})$carboxylic acid salts, sulfuric acid salts, and phosphoric acid salts.

In one embodiment, the fatty deposition control agent as described herein comprises one or more fatty amines according to structure (I), wherein:

A is —$N(R^2)R^3$, $R^1$ is linear or branched $(C_4-C_{30})$alkyl, more typically, linear or branched $(C_8-C_{24})$alkyl, even more typically linear or branched $(C_{12}-C_{22})$alkyl, or $(C_5-C_{24})$cycloalkyl, or linear or branched $(C_4-C_{30})$alkenyl, more typically, linear or branched $(C_8-C_{24})$alkenyl, even more typically linear or branched $(C_{12}-C_{22})$alkenyl, or $(C_5-C_{24})$cycloalkenyl, or $(C_4-C_{30})$alkaryl, more typically $(C_8-C_{24})$alkaryl, or $(C_4-C_{30})$aralkyl, more typically $(C_8-C_{24})$aralkyl, and n is 1, 2, or 3, more typically 1 or 2, even more typically 1.

In one embodiment, $R^2$ and $R^3$ are each independently $(C_1-C_6)$alkyl.

In one embodiment, the fatty deposition control agent is not a fatty amine compound according to formula (I) wherein A is —$N(R^2)R^3$, $R^1$ is linear or branched $(C_{12}-C_{18})$ alkyl, $R^2$ and $R^3$ are each independently $(C_1-C_6)$alkyl, and n is 1. In one embodiment, the fatty deposition control agent is a fatty amine compound according to formula (I), wherein A is —$N(R^2)R^3$, $R^1$ is linear or branched $(C_4-C_{11})$alkyl, more typically $(C_4-C_{10})$alkyl, $R^2$ and $R^3$ are each independently $(C_1-C_6)$alkyl, and n is 1. In one embodiment, the fatty deposition control agent is a fatty amine compound according to formula (I), wherein A is —$N(R^2)R^3$, $R^1$ is linear or branched $(C_{19}-C_{30})$alkyl, more typically $(C_{20}-C_{24})$alkyl, $R^2$ and $R^3$ are each independently $(C_1-C_6)$alkyl, and n is 1.

In one embodiment, $R^2$ and $R^3$ are not each $(C_1-C_6)$alkyl, i.e., the compound according to formula (I) wherein: A is —$N(R^2)R^3$ is not a tertiary alkyl amine, and at least one of $R^2$ and $R^3$ is H or OH. In one embodiment, $R^2$ is $(C_1-C_6)$ alkyl and $R^3$ is H. In one embodiment, $R^2$ is $(C_1-C_6)$alkyl and $R^3$ is OH. In one embodiment, $R^2$ is H and $R^3$ is OH. In one embodiment, $R^2$ and $R^3$ are each H.

Suitable fatty amine deposition control agents include, for example, (C4-C30)alkylamines and (C4-C30)alkyl diamines, such as hexylamine, n-tridecylamine, myristylamine, myristyl hydroxylamine, n-pentadecylamine, n-palmitylamine, n-heptadecylamine, n-stearylamine, isostearylamine, lauryldimethylamine, tetradecyl dimethylamine, and dodecanediamine, (C4-C30)alkenyl amines, such as myristoleyl amine, palmitoleyl amine, elaidyl amine, oleyl amine, linoleyl amine, eladiolinoleyl amine, erucyl amine, docosenoic amine, and docosahexenoic amine, $(C_4-C_{30})$alkaryl amines, such as dodecylphenyl amine, and $(C_4-C_{30})$aralkyl amines, such as phenylethyl amine and phenylhexyl amine, as well as salts thereof and mixtures of such amines and/or salts.

In embodiments where A is —COOH, suitable salts are those having a cationic counterion, $X^+$, including salts of the Group IA and Group IIA elements, such as Na, K, Ca, and Mg salts, as well as amine salts, such as isopropylamine salts.

In one embodiment, the fatty deposition control agent comprises one or more fatty acids according to structure (I), wherein:

A is —COOH, $R^1$ is linear or branched $(C_4-C_{30})$alkyl, more typically, linear or branched $(C_8-C_{24})$alkyl, even more typically linear or branched $(C_{12}-C_{22})$alkyl, or $(C_5-C_{24})$cycloalkyl, or linear or branched $(C_4-C_{30})$alkenyl, more typically, linear or branched $(C_8-C_{24})$alkenyl, even more typically linear or branched $(C_{12}-C_{22})$alkenyl, or $(C_5-C_{24})$cycloalkenyl, or $(C_4-C_{30})$alkaryl, more typically $(C_8-C_{24})$alkaryl, or $(C_4-C_{30})$aralkyl, more typically $(C_8-C_{24})$aralkyl, and "n" is 1, 2, or 3, more typically 1 or 2, even more typically 1. In one embodiment, $R^1$ is linear or branched $(C_4-C_{30})$alkyl; or in another embodiment is a linear or branched $(C_8-C_{24})$alkyl; or in another embodiment is a linear or branched $(C_{12}-C_{22})$ alkyl; or in another embodiment is a $(C_5-C_{24})$cycloalkyl; or in another embodiment is a linear or branched $(C_4-C_{30})$alkenyl; or in another embodiment is a linear or branched $(C_8-C_{24})$alkenyl; or in another embodiment is a linear or branched $(C_{12}-C_{22})$alkenyl; or in another embodiment is a $(C_5-C_{24})$cycloalkenyl; or in another embodiment is a $(C_4-C_{30})$alkaryl; or in another embodiment is a $(C_8-C_{24})$alkaryl, or $(C_4-C_{30})$aralkyl, more typically $(C_8-C_{24})$aralkyl.

Suitable fatty acid deposition control agents include, for example, $(C_4-C_{30})$alkylcarboxylic acids and $(C_4-C_{30})$alkyldicarboxylic acids, such as hexanoic acid, n-tridecanoic acid, myristic acid, palmitic acid, n-stearic acid, isostearic acid, dodecanedioic acid, $(C_4-C_{30})$alkenylcarboxylic acids, such as myristoleic acid, palmitoleic acid, elaidic acid, oleic acid, linoleic acid, erucic acid, docosenoic acid, and docosahexenoic acid, tall oil fatty acid, $(C_4-C_{30})$alkarylcarboxylic acids, such as dodecylphenoic acid, $(C_4-C_{30})$aralkylcarboxylic acids, such as phenyl acetic acid, as well as salts thereof and mixtures of such acids and/or salts. In one embodiment, the fatty acid used as the fatty deposition control agent is oleic acid, linoleic acid, erucic acid, docosenoic acid, docosahexenoic acid, tall oil fatty acid, a combination thereof, as well as salts thereof and mixtures of such acids and/or salts. In another embodiment, the fatty acid used as the fatty deposition control agent is oleic acid, linoleic acid, erucic acid, tall oil fatty acid, a combination thereof, salts thereof and/or mixtures of such acids and/or salts. In yet a further embodiment, the fatty acid used as the fatty deposition control agent is tall oil fatty acid and/or salts thereof.

In one embodiment, the fatty deposition control agent comprises one or more fatty amides according to structure (I): wherein A is —$CON(R^4)R^5$ and $R_1$ is linear or branched $(C_4-C_{30})$alkyl, more typically, linear or branched $(C_8-C_{24})$ alkyl, even more typically linear or branched $(C_{12}-C_{22})$alkyl, or $(C_5-C_{24})$cycloalkyl, or linear or branched $(C_4-C_{30})$alkenyl, more typically, linear or branched $(C_8-C_{24})$alkenyl, even more typically linear or branched $(C_{12}-C_{22})$alkenyl, or $(C_5-C_{24})$cycloalkenyl, or $(C_4-C_{30})$alkaryl, more typically $(C_8-C_{24})$alkaryl, or $(C_4-C_{30})$aralkyl, more typically $(C_8-C_{24})$aralkyl.

In one embodiment $R^4$ and $R^5$ are each independently $(C_1-C_6)$alkyl. In one embodiment, $R^4$ is H and $R^5$ is $(C_1-C_6)$alkyl. In one embodiment, $R^4$ and $R^5$ are each H.

Suitable fatty amide deposition control agents include, for example, $(C_4-C_{30})$alkylamides, such as hexylamide, n-tridecylamide, myristylamide, n-pentadecylamide, n-palmitylamide, n-heptadecylamide, n-stearylamide, isostearylamide, n,n-dimethyl octanamide, n,n-dimethyldecanamide, n,n-dimethyl dodecanamide, n,n-dimethyl tetradecanamide, $(C_4-C_{30})$alkenyl amides, such as myristoleyl amide, palmitoleyl amide, elaidyl amide, oleyl amide, linoleyl amide, eladiolinoleyl amide, erucyl amide, docosenoic amide, and docosahexenoic amide, $(C_4-C_{30})$alkaryl amides, such as dodecylphenyl amide, $(C_4-C_{30})$aralkyl amides, such as phenylethyl amide and phenylhexyl amide, as well as mixtures thereof.

Suitable glycerides are mono- di-, and/or tri-esters of glycerol with one or more fatty acids. In one embodiment, the fatty deposition control agent comprises one or more fatty glycerides, which may comprise one or more fatty monoglycerides, fatty diglycerides, fatty triglycerides, or a mixture thereof. In one embodiment, the one or more fatty triglycerides are present in an amount ranging from 0.001% to 5% by weight of composition. In another embodiment, the one or more fatty triglycerides are present in an amount ranging from 0.01% to 3% by weight of composition. The composition in one embodiment is an adjuvant composition, while in a further embodiment the composition is a concentrated pesticide composition, while in yet another embodiment the composition is an end-use pesticide composition. In one particular embodiment, the one or more fatty triglycerides, when incorporated into an adjuvant composition, are present in an amount greater than 1% by weight of adjuvant composition. In another embodiment, the one or more fatty triglycerides, when incorporated into an adjuvant composition, are present in an amount greater than 25% by weight of adjuvant composition, or in an amount greater than 40% by weight of adjuvant composition, or in an amount greater than 50% by weight of adjuvant composition, or in an amount greater than 70% by weight of adjuvant composition.

In one the fatty glyceride or triglyceride comprises one or more compounds according to structure (IIa)

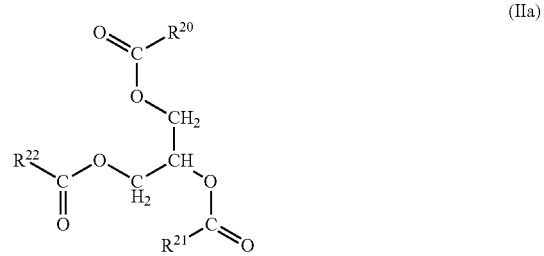

(IIa)

Wherein $R^{20}$, $R^{21}$, and $R^{22}$ are each independently H, $(C_6-C_{30})$alkyl, $(C_{10}-C_{24})$alkyl, or $(C_6-C_{30})$alkenyl, more typically $(C_{10}-C_{24})$alkenyl. In one embodiment, $R^{20}$, $R^{21}$, and $R^{22}$ are each independently $(C_{14}-C_{18})$alkyl. In one embodiment, $R^{20}$, $R^{21}$, and $R^{22}$ are each independently $(C_{10}-C_{24})$alkyl. In one embodiment, $R^{20}$, $R^{21}$, and $R^{22}$ are each independently $(C_{16}-C_{18})$alkyl. In one embodiment, $R^{20}$, $R^{21}$, and $R^{22}$ are each independently $(C_6-C_{30})$alkyl. In one embodiment, $R^{20}$, $R^{21}$, and $R^{22}$ are each independently $(C_6-C_{30})$alkenyl. In one embodiment, $R^{20}$, $R^{21}$, and $R^{22}$ are each independently $(C_{10}-C_{24})$alkenyl. $R^{20}$, $R^{21}$, and $R^{22}$ may each be linear or branched and may each, optionally, be substituted on one or more carbon atoms with hydroxyl, and provided that at least one of $R^{20}$, $R^{21}$, and $R^{22}$ is not H.

Alkyl moieties suitable as groups of structure (IIa) include, for example, the alkyl groups disclosed above as being suitable for the $R^1$ substituent of the compound of formula (I).

Alkenyl moieties suitable as groups of structure (IIa) may be mono-unsaturated or poly-unsaturated and include, for example, the alkenyl groups disclosed above as being suitable for the $R^1$ substituent of the compound of formula (I).

In one embodiment, the fatty glyceride comprises one or more fatty monoglyceride compounds according to structure (IIa) wherein two of $R^{20}$, $R^{21}$ and $R^{22}$ are each independently H and the remaining one of $R^{20}$, $R^{21}$ and $R^{22}$ is $(C_6-C_{30})$ alkyl, more typically $(C_6-C_{24})$alkyl, or $(C_6-C_{30})$alkenyl, more typically $(C_8-C_{24})$alkenyl.

In one embodiment, the fatty glyceride comprises one or more fatty diglyceride compounds according to structure (IIa) wherein two of $R^{20}$, $R^{21}$ and $R^{22}$ are each independently $(C_6-C_{30})$alkyl, more typically $(C_6-C_{24})$alkyl, or $(C_6-C_{30})$ alkenyl, more typically $(C_8-C_{24})$alkenyl, and the remaining one of $R^{20}$, $R^{21}$ and $R^{22}$ is H.

In one embodiment, the fatty glyceride comprises one or more fatty triglyceride compounds according to structure (IIa) wherein $R^{20}$, $R^{21}$, and $R^{22}$ are each independently $(C_6-C_{24})$alkyl, more typically $(C_6-C_{24})$alkyl, or $(C_8-C_{24})$alkenyl, more typically $(C_8-C_{24})$alkenyl. In one embodiment $R^{20}$, $R^{21}$, and $R^{22}$ are each independently a linear or branched $(C_4-C_{30})$alkyl, more typically, linear or branched $(C_8-C_{24})$alkyl, even more typically linear or branched $(C_{12}-C_{22})$alkyl, or $(C_5-C_{24})$cycloalkyl, or linear or branched $(C_4-C_{30})$alkenyl, more typically, linear or branched $(C_8-C_{24})$alkenyl, even more typically linear or branched $(C_{12}-C_{22})$alkenyl, or $(C_5-C_{24})$cycloalkenyl, or $(C_4-C_{30})$alkaryl, more typically $(C_8-C_{24})$alkaryl, or $(C_4-C_{30})$aralkyl, more typically $(C_8-C_{24})$aralkyl. In one embodiment, $R^{20}$, $R^{21}$, and $R^{22}$ are each independently a linear or branched $(C_4-C_{30})$alkyl; or in another embodiment is a linear or branched $(C_8-C_{24})$alkyl; or in another embodiment is a linear or branched $(C_{12}-C_{22})$alkyl; or in another embodiment is a $(C_5-C_{24})$cycloalkyl; or in another embodiment is a linear or branched $(C_4-C_{30})$alkenyl; or in another embodiment is a linear or branched $(C_8-C_{24})$alkenyl; or in another embodiment is a linear or branched $(C_{12}-C_{22})$alkenyl; or in another embodiment is a $(C_5-C_{24})$cycloalkenyl; or in another embodiment is a $(C_4-C_{30})$alkaryl; or in another embodiment is a $(C_8-C_{24})$alkaryl, or $(C_4-C_{30})$aralkyl, more typically $(C_8-C_{24})$aralkyl.

In one embodiment, the fatty glyceride or triglyceride comprises one or more compounds according to structure (II):

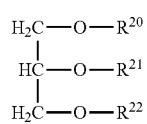

(II)

wherein:
$R^{20}$, $R^{21}$, and $R^{22}$ are each independently H, carboxy$(C_6-C_{30})$alkyl, more typically carboxy$(C_{10}-C_{24})$alkyl, or carboxy$(C_6-C_{30})$alkenyl, more typically carboxy$(C_{10}-C_{24})$alkenyl. In one embodiment, $R^{20}$, $R^{21}$, and $R^{22}$ are each independently carboxy$(C_{14}-C_{18})$alkyl. In one embodiment, $R^{20}$, $R^{21}$, and $R^{22}$ are each independently carboxy$(C_{10}-C_{24})$alkyl. In one embodiment, $R^{20}$, $R^{21}$, and $R^{22}$ are each independently carboxy$(C_{16}-C_{18})$alkyl. In one embodiment, $R^{20}$, $R^{21}$, and $R^{22}$ are each independently carboxy$(C_6-C_{30})$alkyl. In one embodiment, $R^{20}$, $R^{21}$, and $R^{22}$ are each independently carboxy$(C_6-C_{30})$alkenyl. In one embodiment, $R^{20}$, $R^{21}$, and $R^{22}$ are each independently carboxy$(C_{10}-C_{24})$alkenyl. The alkyl portions of the respective carboxyalkyl groups and the alkenyl portions of the respective carboxyalkenyl groups may each be linear or branched and may each, optionally, be substituted on one or more carbon atoms with hydroxyl, and provided that at least one of $R^{20}$, $R^{21}$, and $R^{22}$ is not H.

Alkyl moieties suitable as the alkyl portion of the carboxyalkyl groups of structure (II) include, for example, the alkyl groups disclosed above as being suitable for the $R^1$ substituent of the compound of formula (I).

Alkenyl moieties suitable as the alkenyl portion of the carboxyalkenyl groups of structure (II) may be mono-unsaturated or poly-unsaturated and include, for example, the alkenyl groups disclosed above as being suitable for the $R^1$ substituent of the compound of formula (I).

In one embodiment, the fatty glyceride comprises one or more fatty monoglyceride compounds according to structure (II) wherein two of $R^{20}$, $R^{21}$ and $R^{22}$ are each independently H and the remaining one of $R^{20}$, $R^{21}$ and $R^{22}$ is carboxy$(C_6-C_{30})$alkyl, more typically carboxy$(C_6-C_{24})$alkyl, or carboxy$(C_6-C_{30})$alkenyl, more typically carboxy$(C_8-C_{24})$alkenyl.

In one embodiment, the fatty glyceride comprises one or more fatty diglyceride compounds according to structure (II) wherein two of $R^{20}$, $R^{21}$ and $R^{22}$ are each independently carboxy$(C_6-C_{30})$alkyl, more typically carboxy$(C_6-C_{24})$alkyl, or carboxy$(C_6-C_{30})$alkenyl, more typically carboxy$(C_8-C_{24})$alkenyl, and the remaining one of $R^{20}$, $R^{21}$ and $R^{22}$ is H.

In one embodiment, the fatty glyceride comprises one or more fatty triglyceride compounds according to structure (II) wherein $R^{20}$, $R^{21}$, and $R^{22}$ are each independently carboxy$(C_6-C_{24})$alkyl, more typically carboxy$(C_6-C_{24})$alkyl, or carboxy$(C_8-C_{24})$alkenyl, more typically carboxy$(C_8-C_{24})$alkenyl.

In one embodiment, the fatty glyceride is a mixture comprising at least one fatty monoglyceride compound and at least one fatty diglyceride compound, or at least one fatty monoglyceride compound and at least one fatty triglyceride compound, or at least one fatty diglyceride compound and at least one fatty triglyceride compound, or at least one fatty monoglyceride compound, at least one fatty diglyceride compound, and at least one fatty triglyceride compound.

Suitable sources of fatty glycerides include naturally occurring mixtures of fatty glycerides and which may further comprise one or more fatty acids, such as vegetable oils, including, for example, palm oil, soybean oil, rapeseed oil, high erucic acid rapeseed oil, sunflower seed oil, peanut oil, cottonseed oil, palm kernel oil, linseed oil, coconut oil, olive oil, safflower oil, sesame oil, tung oil, canola oil, castor oil, meadowfoam seed oil, hemp oil, as well as mixtures of such oils.

In one embodiment, the fatty deposition control agent comprises one or more $(C_1-C_3)$alkyl esters according to structure (III):

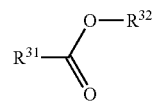

(III)

wherein:
$R^{31}$ is $(C_6-C_{24})$alkyl or $(C_6-C_{24})$alkenyl,
$R^{32}$ is alkyl or alkenyl.

In one embodiment, the fatty acid ester comprises one or more compounds according to structure (III) wherein $R^{31}$ is $(C_6-C_{24})$alkyl, such as, for example, hexyl, heptyl, octyl, nonyl, decyl, undecyl, dodecyl, tridecyl, tetradecyl, pentadecyl, hexadecyl, heptadecyl, octadecyl, nonadecyl, eicosyl, docosyl, tricosyl, tetracosyl. In another embodiment, $R^{31}$ is $(C_6-C_{24})$aryl, $(C_4-C_{30})$alkaryl, $(C_8-C_{24})$alkaryl, or $(C_8-C_{30})$aryl.

In one embodiment, the fatty acid ester comprises one or more compounds according to structure (III) wherein $R^{31}$ is mono-unsaturated or poly-unsaturated $(C_6-C_{24})$alkenyl, such as, for example, cis-9-hexadecenyl all cis-7,10,13-hexadecatrienyl, cis-6-octadecenyl, trans-6-octadecenyl, cis-7-octadecenyl, cis-9-octadecenyl, trans-9-octadecenyl, cis-11-octadecenyl trans-11-octadecenyl, cis-12-octadecenyl, cis, cis-9,12-octadecedienyl, trans-9,12-octadecedienyl, all cis-6,9,12-octadecatrienyl, all cis-9,12,15-octadecatrienyl, all cis-6,9,12,15,-octadecatetraenyl, cis-11-eicosenyl, cis, cis-11,14-eicosadienyl, all cis-11,14,17-eicosatrienyl all cis-5,8,11,14-eicosatetraenyl, all cis-8,11,14,17-eicosatetraenyl, all cis-5,8,11,14,17-eicosapentaenyl, cis-13-docosenyl, cis, cis-13,16-docosadienyl, all cis-6,9,12-octadecatrienyl, all cis-7,10,13,16-docosatetraenyl, all cis-7,10,13,16, 19-docosapentaenyl, all cis-4,7,10,13,16,19-docosahexaenyl, cis-15-tetracosenyl, all cis-9,12,15,18,21-tetracosapentaenyl, or all cis-6,9,12,15,18,21-tetracosahexaenyl.

In one embodiment, the fatty acid ester comprises one or more compounds according to structure (III) wherein $R^{31}$ is $(C_6-C_{24})$alkyl and one or more compounds according to structure (III) wherein $R^{31}$ is mono-unsaturated or poly-unsaturated $(C_6-C_{24})$alkenyl.

In one embodiment, the fatty acid ester comprises one or more compounds according to structure (III) wherein $R^{31}$ is $(C_6-C_{24})$alkyl and one or more compounds according to structure (I) wherein $R^{31}$ is mono-unsaturated or poly-unsaturated $(C_6-C_{24})$alkenyl, and $R^{32}$ is methyl.

In one embodiment, the fatty acid ester comprises one or more compounds according to structure (III) wherein $R^{31}$ is $(C_6-C_{12})$alkyl or $(C_6-C_{12})$alkenyl. In another embodiment, the fatty acid ester comprises one or more compounds according to structure (III) wherein $R^{31}$ is $(C_{13}-C_{24})$alkyl or $(C_{13}-C_{24})$alkenyl.

In one embodiment, the fatty acid $(C_1-C_3)$alkyl ester comprises one or more compounds according to structure (III) wherein $R^{31}$ is $(C_6-C_{12})$alkyl or $(C_6-C_{12})$alkenyl, and $R^{12}$ is $(C_1-C_3)$alkyl. In another embodiment, the fatty acid ester comprises one or more compounds according to structure (III) wherein $R^{31}$ is $(C_{13}-C_{24})$alkyl or $(C_{13}-C_{24})$alkenyl, and $R^{32}$ is methyl.

Suitable fatty acid $(C_1-C_3)$alkyl esters may be made by, for example, acid-catalyzed esterification of corresponding fatty acids or corresponding fatty mono-, di- and/or tri-glycerides with an alcohol, typically a $(C_1-C_3)$alkanol, more typically methanol, or by transesterification of the corresponding fatty mono-, di- and/or tri-glycerides with an alcohol, typically a $(C_1-C_3)$alkanol, more typically methanol. Convenient sources of fatty acids and fatty acid glycerides include the vegetable oils and animals fats described above. Suitable fatty acid methyl esters are commercially available. One commercial source of fatty acid $(C_1-C_3)$alkyl esters is "bio-diesel" fuels made by transesterification of vegetable oils or animal fats with a $(C_1-C_3)$ alcohol, more typically methanol.

Examples of fatty acid esters suitable as the fatty deposition control agent include, butyl myristate, cetyl palmitate, decyloleate, glyceryl laurate, glyceryl ricinoleate, glyceryl stearate, glyceryl isostearate, hexyl laurate, isobutyl palmitate, isocetyl stearate, isopropyl isostearate, isopropyl laurate, isopropyl linoleate, isopropyl myristate, isopropyl palmitate, isopropyl stearate, propylene glycol monolaurate, propylene glycol ricinoleate, propylene glycol stearate, and propylene glycol isostearate, methyl, ethyl, or propyl hexanoate, methyl, ethyl, or propyl heptanoate, methyl, ethyl, or propyl octanoate, methyl, ethyl, or propyl nonanoate, methyl, ethyl, or propyl decanoate, methyl, ethyl, or propyl undecanoate, methyl, ethyl, or propyl dodecanoate, methyl, ethyl, or propyl tridecanoate, methyl, ethyl, or propyl tetradecanoate, methyl, ethyl, or propyl pentadecanoate, methyl, ethyl, or propyl hexadecanoate, methyl, ethyl, or propyl heptadecanoate, methyl, ethyl, or propyl octadecanoate, methyl, ethyl, or propyl nonadecanoate, methyl, ethyl, or propyl eicosanoate, methyl, ethyl, or propyl docosanoate, methyl, ethyl, or propyl tricosanoate, methyl, ethyl, or propyl tetracosanoate, methyl, ethyl, or propyl cis-9-hexadecenoate, methyl, ethyl, or propyl all cis-7,10,13-hexadecatrienoate methyl, ethyl, or propyl cis-6-octadecenoate, methyl, ethyl, or propyl trans-6-octadecenoate, methyl, ethyl, or propyl cis-7-octadecenoate, methyl, ethyl, or propyl cis-9-octadecenoate, methyl, ethyl, or propyl trans-9-octadecenoate, methyl, ethyl, or propyl cis-11-octadecenoate, methyl, ethyl, or propyl trans-11-octadecenoate, methyl, ethyl, or propyl cis-12-octadecenoate, methyl, ethyl, or propyl cis, cis-9,12-octadecedienoate, methyl, ethyl, or propyl trans-9,12-octadecedienoate, methyl, ethyl, or propyl all cis-6,9,12-octadecatrienoate, methyl, ethyl, or propyl ester all cis-9,12,15-octadecatrienoate, methyl, ethyl, or propyl all cis-6,9,12,15,-octadecatetraenoate, methyl, ethyl, or propyl cis-11-eicosenoate, methyl, ethyl, or propyl cis, cis-11,14-eicosadienoate, methyl, ethyl, or propyl all cis-11,14,17-eicosatrienoate, methyl, ethyl, or propyl all cis-5,8,11,14-eicosatetraenoate, methyl, ethyl, or propyl all cis-8,11,14, 17-eicosatetraenoate, methyl, ethyl, or propyl all cis-5,8,11, 14,17-eicosapentaenoate, methyl, ethyl, or propyl cis-13-docosenoate, methyl, ethyl, or propyl cis, cis-13,16-docosadienoate, methyl, ethyl, or propyl all cis-6,9,12-octadecatrienoate, methyl, ethyl, or propyl all cis-7,10,13, 16-docosatetraenoate, methyl, ethyl, or propyl all cis-7,10, 13,16,19-docosapentaenoate, methyl, ethyl, or propyl all cis-4,7,10,13,16,19-docosahexaenoate, methyl, ethyl, or propyl cis-15-tetracosenoate methyl, ethyl, or propyl all cis-9,12,15,18,21-tetracosapentaenoate, methyl, ethyl, or propyl all cis-6,9,12,15,18,21-tetracosahexaenoate, including mixtures two or more of any of such fatty acid $(C_1-C_3)$ alkyl esters. More typically, the fatty acid $(C_1-C_3)$alkyl ester component of the composition as described herein comprises a mixture of two or more of such fatty acid $(C_1-C_3)$ alkyl esters, in the form of one or more $(C_1-C_3)$alkyl esters of one or more vegetable oils, more typically, a methylated vegetable oil, even more typically, methylated soybean oil or methylated rapeseed oil.

In one embodiment, the composition comprises one or more hydrotropes. As used herein the term "hydrotrope" means an amphiphilic compound that typically does not form micelles below 0.5 wt % in aqueous solutions the presence of which in an aqueous solution tends to solubilize hydrophobic compounds in the aqueous solution, and includes, for example, alkaryl sulfonate salts, such as sodium xylene sulfonate and sodium toluene sulfonate, as well as alkyl phosphate esters, alkyaryl phosphate esters, phosphate polyether esters, and salts thereof, such as potassium laureth phosphate, phenol ethoxy phosphate, and alkylene glycols and polyalkylene glycols, such as propylene glycols, polyethylene glycols, and water soluble salts of aromatic carboxylic acids. The addition of a hydrotrope to the composition as described herein typically increases the solubility of the fatty deposition control agent (such as, for example, a fatty drift control agent or a fatty anti-rebound agent) in the aqueous medium and thus provides an opportunity to selectively adjust such solubility.

In one embodiment, the adjuvant, concentrated pesticide composition, and pesticide compositions as described herein comprise one or more surfactants other than any hydrotrope component. Suitable surfactants include anionic surfactants, cationic surfactants, amphoteric/zwitterionic surfactants, nonionic surfactants, and mixtures thereof. Suitable anionic surfactants include alkyl sulfate surfactants, such as ammonium lauryl sulfate, and alkaryl sulfonate surfactants, such as dodecylbenzene sulfonate. In another embodiment, suitable anionic surfactants include alkyl phosphate esters, alkyaryl phosphate esters, phosphate polyether esters, and salts thereof, such as potassium laureth phosphate, phenol ethoxy phosphate. Suitable cationic surfactants include alkoxylated amine surfactants such as ethoxylated tallow amine acetate, and quaternary ammonium surfactants, such as stearyl dimethyl benzyl ammonium chloride. Suitable amphoteric surfactants include alkylamphocetate surfactants such as cocoamphoacetate. Suitable zwitterionic surfactants include alkyl betaine surfactants such as lauryldimethylbetaine, and cocoamidopropylbetaine.

In one embodiment, the adjuvant composition as described herein comprises one or more nonionic surfactants selected from fatty acid glycol ester surfactants, polyalkoxylated triglyceride surfactants, alkoxylated fatty alcohol surfactants, polyalkoxylated alkylphenol surfactants, polyalkoxylated alkarylphenol surfactants, polyalkoxylated fatty amine surfactants, amine oxide surfactants, alkanolamide surfactants, glycoside surfactants, and ethylene/propylene block copolymers. In one embodiment, the at least one surfactant is a mixture of surfactants comprising polyalkoxylated triglycerides, fatty acid glycol ester surfactants, or a combination thereof, typically a polyalkoxylated triglycerides, and at least one alcohol ethoxylate. The adjuvant composition can comprising: at least one fatty deposition control agent; one or more surfactants present in an amount from about 5 to 75 wt % by weight of adjuvant composition; and optionally, one or more hydrotropes or a liquid medium. In one embodiment, the one or more surfactants are present in an amount from about 20 to 60 wt %, by weight of adjuvant composition.

Suitable fatty acid glycol ester surfactants include glycol fatty acid monoesters and glycol fatty acid diesters, more typically mono- and di-esters of glycol s and saturated or unsaturated ($C_8$-$C_{22}$), more typically ($C_{12}$-$C_{16}$), fatty acids and mixtures thereof, even more typically mono- and di-esters of poly(ethylene glycol) or poly(propylene glycol) and saturated or unsaturated ($C_8$-$C_{22}$), more typically ($C_{12}$-$C_{16}$), fatty acids and mixtures thereof, such as for example, poly(ethylene glycol) monomyristates, poly(ethylene glycol) monostearates, poly(ethylene glycol) distearates, poly(ethylene glycol) monooleates, poly(ethylene glycol) dioleates poly(propylene glycol) monooleates, and poly(ethylene glycol) linolenates, poly(ethylene glycol) dibehenates, poly(ethylene glycol) monobehenates poly(ethylene glycol) monoerucates.

Suitable polyalkoxylated triglycerides include, for example, glycerol fatty acid triesters that have been alkoxylated with from 2 or more moles of ($C_2$-$C_4$)alkylene oxide units per molecule, as well as alkyl esters of thereof, including alkoxylated soybean oils, alkoxylated rapeseed oils, alkoxylated cottonseed oils, and alkoxylated castor oils, as well as alkyl esters thereof. Suitable alkoxylated castor oils include, for example, polyethoxylated castor oils, polypropoxylated castor oils, and polyethoxylated-propoxylated castor oils, ethoxylated castor oil oleate, and ethoxylated castor oil trilaurate.

Suitable alkoxylated fatty alcohol surfactants, include linear or branched, saturated or unsaturated ($C_6$-$C_{22}$), more typically ($C_{10}$-$C_{22}$), alcohols, such as, for example, lauryl alcohol, tridecyl alcohol, cetyl alcohol, stearyl alcohol, and oleyl alcohol, that are alkoxylated with, for example, from 1 to 50, more typically 2 to 50, oxyalkylene units per molecule, such as, for example, ethoxylated lauryl alcohol, ethoxylated cetyl alcohol, ethoxylated tridecyl alcohol, ethoxylated stearyl alcohol, and ethoxylated oleyl alcohol. In one embodiment, the alkoxylated fatty alcohol surfactant comprises an alkoxylated branched ($C_{10}$-$C_{22}$) alcohol, such as an ethoxylated tridecyl alcohol. In one embodiment, the alkoxylated fatty alcohol surfactant is an alcohol ethoxylate. In one embodiment, the alcohol ethoxylate is a C6-C18 alcohol ethoxylate. In another embodiment, the alcohol ethoxylate is a C8-C16 alcohol ethoxylate. In another embodiment, the alcohol ethoxylate is a C8-C14 alcohol ethoxylate.

Suitable sorbitan alkyl ester surfactants are known compounds, and include non-alkoxylated sorbitan esters, typically referred to as "Span" surfactants, such as, for example, sorbitan monolaurate (Span 20), sorbitan monopalmitate (Span 40), sorbitan tristearate (Span 65), sorbitan monooleate (Span 80) and polyoxyalkylene glycol sorbitan alkyl esters, typically referred to as "tween" or "polysorbate" surfactants, such as, for example, polyoxyethylene (20) sorbitan monolaurate (Tween 20 or Polysorbate 20), polyoxyethylene (20) sorbitan monopalmitate (Tween 40 or Polysorbate 40) polyoxyethylene (20) sorbitan monostearate (Tween 60 or Polysorbate 60), polyoxyethylene (20) sorbitan monooleate (Tween 80 or Polysorbate 80).

Suitable polyalkoxylated alkylphenol surfactants and polyalkoxylated alkarylphenol surfactants include alkylphenols, such as octylphenol and nonyl phenol and alkarylphenols, such as tristryrylphenol, that are polyalkoxylated, typically with from 2 to 50 oxyalkylene units, such as oxyethylene units, oxypropylene units, or a mixture thereof, per molecule and include, for example polyalkoxylated octylphenols, polyalkoxylated nonylphenols polyalkoxylated laurylphenols, and polyalkoxylated tristyrylphenol, such as polyethoxylated octylphenols, polyethoxylated nonylphenols, and polyethoxylated tristyrylphenols.

Suitale polyalkoxylated fatty amine surfactants include, for example, tallow amine ethoxylates, cocamine ethoxylates, stearylamine ethoxylates, oleyl amine ehtoxylates, erucyl amine ethoxylates, and behenyl amine ethoxylates.

Suitable amine oxide surfactants are known compounds and include, for example, lauramine oxide, cocamine oxide, stearamine oxide, stearamidopropylamine oxide, palmitamidopropylamine oxide, decylamine oxide Suitable alkanolamide surfactants are known compounds and include, for example, cocamide DEA, cocamide MEA, cocamide MIPA, PEG-5 cocamide MEA, lauramide DEA.

Suitable glycoside surfactants are known compounds and include, for example, ($C_4$-$C_{22}$)alkylhexosides, such as butylglucoside, nonylglucoside, decylglucoside, dodecylglucoside, hexadecylglucoside, octadecylglucoside, ($C_4$-$C_{22}$)alkylpolyhexosides, such as butylpolyglucosides, nonylpolyglucosides, decylpolyglucosides, tetradecylpolyglucosides, hexadecylpolyglucosides, erucylpolyglucosides, ($C_4$-$C_{22}$)alkylpentosides, such as nonylarabinosides, decylarabinoside, hexadecylarabinoside, octylxyloside, nonylxyloside, decylxyloside, hexadecylxyloside, erucylxyloside, and ($C_4$-$C_{22}$)alkylpolypentosides, such as butylpolyarabinosides, nonylpolyarabinosides, decylpolyarabinosides, hexadecylpolyarabinosides, octadecylpolyarabinosides, erucylpolyarabinosides, butylpolyxylosides, nonylpolyxylosides, decylpolyxylosides, octadecylpolyxylosides, and erucylpolyxylosides butylpoly(arabino-co-xylo)sides, nonylpoly(arabino-co-xylo)sides, decylpoly(arabino-co-xylo)sides, hexadecylpoly(arabino-co-xylo)sides, octadecylpoly(arabino-co-xylo)sides, erucylpoly(arabino-co-xylo)sides, and mixtures of any of such compounds, wherein the terminology "poly(arbino-co-xylo)side" denotes a copolymeric chain of monomeric residues of arabinose and xylose.

Suitable poly(oxyethylene-oxypropylene) block copolymer surfactants are known compounds, typically referred to as "Poloxamers" and are linear triblock polymers comprising a hydrophilic poly(oxypropylene) segment disposed between two hydrophilic poly(oxyethylene) segment s and include, for example, poloxamer 181.

In one embodiment, the adjuvant composition as described herein comprises up to about 99.9 pbw, more typically from about 1 to about 30 pbw, of one or more surfactants per 100 pbw of the adjuvant composition.

In one embodiment, the adjuvant composition according to the present invention comprises, based on 100 parts by weight of the adjuvant composition:
from 0.1 to 99.9 pbw, more typically from 40 to 99 pbw, even more typically from 60 to 90 pbw of the fatty deposition control agent,
from 0.1 to 99.9 pbw, more typically from 1 to 60 pbw, and even more typically from 10 to 40 pbw of one or more surfactants,
optionally, a liquid medium, and
optionally, one or more hydrotropes.

In one embodiment, the adjuvant composition comprises a fatty deposition control agent comprising one or more fatty acids and one or more polyalkoxylated triglyceride surfactants. In one embodiment, the adjuvant composition comprises a fatty deposition control agent comprising one or more fatty acids, one or more polyalkoxylated triglyceride surfactants and one or more polyalkoxylated fatty alcohol surfactants. In one embodiment, the fatty acid deposition control agent is present in an amount ranging from 10% to 95% by weight of composition. In one embodiment, the fatty acid deposition control agent is present in an amount ranging from 70% to 90% by weight of composition. In another embodiment, the fatty acid deposition control agent is present in an amount ranging from 60% to 90% by weight of composition. In yet another embodiment, the fatty acid deposition control agent is present in an amount ranging from 80% to 95% by weight of composition. In another embodiment, the fatty acid deposition control agent is present in an amount ranging from 60% to 75% by weight of composition. The surfactant(s) (e.g., one or more polyalkoxylated triglyceride surfactants, or one or more polyalkoxylated fatty alcohol surfactants, or a combination of both) can be present in an amount ranging from 5% to 50% by weight of composition. In another embodiment, the surfactant(s) (e.g., one or more polyalkoxylated triglyceride surfactants, or one or more polyalkoxylated fatty alcohol surfactants, or a combination of both) is present in an amount ranging from 7% to 20% by weight of composition or, in another embodiment, present in an amount ranging from 10% to 40% by weight of composition or, in another embodiment, present in an amount ranging from 5% to 25% by weight of composition or, in another embodiment, present in an amount ranging from 20% to 35% by weight of composition.

In one embodiment, the adjuvant composition comprises a fatty deposition control agent comprising one or more fatty glycerides, more typically vegetable oils, and one or more surfactants selected from fatty acid glycol ester surfactants.

In one embodiment, the adjuvant composition comprises a fatty deposition control agent comprising one or more fatty acid esters and one or more surfactants selected from alkoxylated alcohol surfactants.

In one embodiment, the adjuvant composition comprises a fatty deposition control agent comprising one or more fatty amines and one or more fatty amine ethoxylate surfactants.

In one embodiment, the adjuvant composition according to the present invention comprises, based on 100 parts by weight of the adjuvant composition:
from 0.1 to 50 pbw, more typically from 1 to 20 pbw, even more typically from 90 to 98 pbw of the fatty deposition control agent,
from about 5 to about 80 pbw, more typically from about 20 to about 60 pbw, of one or more hydrotropes,
from about 19.9 to about 94.9 pbw, more typically from about 20 to about 79 pbw, of a liquid medium, and
optionally, one or more surfactants.

In one embodiment, the adjuvant composition comprises a fatty deposition control agent comprising one or more fatty acids and one or more hydrotropes.

In one embodiment, the adjuvant composition comprises a fatty deposition control agent comprising one or more fatty acids, one or more hydrotropes, and one or more one or more polyalkoxylated triglyceride surfactants.

In one embodiment, the adjuvant composition comprises: (a) at least one fatty deposition control agent; (b) one or more surfactants present in an amount from about 5 to 75 wt % by weight of adjuvant composition; and (c) optionally, one or more hydrotropes or a liquid medium. In one embodiment, the one or more surfactants are present in an amount from about 20 to 60 wt %, by weight of adjuvant composition.

In one embodiment, the adjuvant composition forms stable emulsion upon dilution in water and provides deposition control benefits for pesticide spray solutions.

In one embodiment, the adjuvant composition as described herein does not comprise more than 0.5 pbw per 100 pbw of the composition, more typically does not comprise more than 0.05 pbw per 100 pbw of the composition, of any polymeric deposition control agent, such as a polysaccharide deposition control agent, and even more typically does not comprise any polymeric drift control agent.

In one embodiment, the adjuvant composition as described herein comprises the surfactant deposition control agent as the sole deposition control agent of the composition.

In one embodiment, an adjuvant composition as described herein comprises a fatty deposition control agent comprising one or more fatty acids or fatty glycerides, more typically vegetable oils, and one or more surfactants.

The one or more surfactants, in some embodiments, is selected from alkoxylated alcohol surfactants and/or ethoxylated vegetable oil surfactants, for example, ethoxylated castor oil. In one embodiment, the alkoxylated alcohol surfactants contain an alkyl group having from about 4 to 8 carbons.

In one embodiment, the adjuvant composition as described herein comprises:
from 0.1 to 50 wt %, or from 1 to 20 wt %, or from 0.1 to 75 wt %, or from 10 to 55 wt %, by weight of adjuvant composition, of the fatty deposition control agent;
from about 1 to about 99 wt %, or from about 20 to about 79 wt %, by weight of the adjuvant composition, of a liquid medium; and
from 1 to 90 wt %, or from 10 to 80 wt %, or from 5 to 75 wt %, or from 20 to 60 wt %, by weight of adjuvant composition, one or more surfactants.

Suitable pesticides are biologically active compounds used to control agricultural pests and include, for example, herbicides, plant growth regulators, crop dessicants, fungicides, bacteriocides, bacteriostats, insecticides, and insect repellants, as well as their water soluble salts and esters. Suitable pesticides include, for example, aryloxyphenoxypropionate herbicides, such as haloxyfop, cyhalofop, and quizalofop, triazine herbicides such as metribuzin, hexaxinone, or atrazine; sulfonylurea herbicides such as chlorsulfuron; uracils such as lenacil, bromacil, or terbacil; urea herbicides such as linuron, diuron, siduron, or neburon; acetanilide herbicides such as alachlor, or metolachlor; thiocarbamate herbicides such as benthiocarb, triallate; oxadiazolone herbicides such as oxadiazon; isoxazolidone herbicides, phenoxy carboxylic acid herbicides, diphenyl ether herbicides such as fluazifop, acifluorfen, bifenox, or oxyfluorfen; dinitro aniline herbicides such as trifluralin; organophosphonate herbicides such as glufosinate salts and esters and glyphosate salts and esters; dihalobenzonitrile herbicides such as bromoxynil, or ioxynil, benzoic acid herbicides, dipyridilium herbicides such as paraquat, and pyridine and pyridineoxy carboxylic acid herbicides such as clopyralid, fluroxypyr, picloram, triclopyr, and aminopyralid. Suitable fungicides include, for example, nitrilo oxime fungicides such as cymoxanil; imidazole fungicides such as benomyl, carbendazim, or thiophanate-methyl; triazole fungicides such as triadimefon; sulfenamide fungicides, such as captan; dithio-carbamate fungicides such as maneb, mancozeb, or thiram; chloronated aromatic fungicides such as chloroneb; dichloro aniline fungicides such as iprodione, strobilurin fungicides such as kresoxim-methyl, trifloxystrobin or azoxystrobin; chlorothalonil; copper salt fungicides such as copper oxychloride; sulfur; phenylamides; and acylamino fungicides such as metalaxyl or mefenoxam. Suitable insecticides, include, for example, carbamate insecticides, such as methomyl, carbaryl, carbofuran, or aldicarb; organo thiophosphate insecticides such as EPN, isofenphos, isoxathion, chlorpyrifos, or chlormephos; organophosphate insecticides such as terbufos, monocrotophos, or terachlorvinphos; perchlorinated organic insecticides such as methoxychlor; synthetic pyrethroid insecticides such as fenvalerate, abamectin or emamectin benzoate, neonicotinoide insecticides such as thiamethoxam or imidacloprid; pyrethroid insecticides such as lambda-cyhalothrin, cypermethrin or bifenthrin, and oxadiazine insecticides such as indoxacarb, imidaclopryd, or fipronil. Suitable miticides include, for example, propynyl sulfite miticides such as propargite; triazapentadiene miticides such as amitraz; chlorinated aromatic miticides such as chlorobenzilate, or tetradifan; and dinitrophenol miticides such as binapacryl. Suitable nematicides include carbamate nematicides, such as oxamyl.

Pesticide compounds are, in general, referred herein to by the names assigned by the International Organization for Standardization (ISO). ISO common names may be cross-referenced to International Union of Pure and Applied Chemistry ("IUPAC") and Chemical Abstracts Service ("CAS") names through a number of sources.

In one embodiment, the pesticide comprises one or more compounds selected from herbicides, plant growth regulators, crop dessicants, fungicides, bacteriocides, bacteriostats, insecticides, miticides, nematocides, insect repellants, and mixtures thereof.

In one embodiment, the pesticide is an herbicide and the pesticide composition is an herbicide composition.

In one embodiment, the pesticide comprises one or more herbicide compounds selected from glyphosate, water soluble glyphosate salts, water soluble glyphosate esters, and mixtures thereof, more typically selected from the sodium salt of glyphosate, the potassium salt of glyphosate, the ammonium salt of glyphosate, the dimethyl ammonium salt of glyphosate, the isopropyl amine salt of glyphosate, the trimethyl ammonium salt of glyphosate, and mixtures thereof.

In one embodiment, the pesticide comprises one or more auxinic herbicides.

In one embodiment, the pesticide comprises one or more herbicide compounds selected from glyphosate, glufosinateand their respective water soluble salts and esters, and mixtures thereof.

In one embodiment the water soluble salts of glyphosate, and/or glufosinate comprise a cation selected from dimethyl ammonium, isopropyl ammonium, diethyl ammonium, triethylammonium, monoethanol ammonium, diethanol ammonium, triethanol ammonium, dimethylethanol ammonium, diethyleneglycol ammonium, triisopropyl ammonium, tetraethylammonium, and choline cations.

In one embodiment, the pesticide comprises a mixture of glyphosate or a water soluble salt or ester of glyphosate and one or more auxinic herbicides, with the proviso that if the pesticide composition further comprises a fatty amine drift control agent, then the fatty amine deposition control agent is not a tertiary alkyl fatty amine.

In one embodiment, the concentrated pesticide composition as described herein comprises, based on 100 pbw of the pesticide composition, from about 1 pbw, more typically from about 15 pbw, even more typically from about 30 pbw, and still more typically from about 40 pbw, to about 90 pbw, more typically to about 65 pbw, even more typically about 60 pbw, and still more typically about 55 pbw, of the one or more pesticide compounds.

In one embodiment, the concentrated pesticide composition according to the present invention comprises, based on 100 parts by weight of the concentrated pesticide composition:

from about 1 pbw to 90 pbw, more typically from about 15 to about 65 pbw, even more typically from 30 pbw to 60 pbw, and still more typically from 40 pbw to 55 pbw, of one or more pesticide compounds, optionally up to 98.95 pbw, more typically from greater than 0 pbw to 69.5 pbw, and even more typically from 20 to 59.5 pbw of the liquid medium, from 0.05 to 90 pbw, more typically from 0.5 to 20 pbw, even more typically from 0.5 to 10 pbw fatty deposition control agent, optionally one or more hydrotropes, and optionally, one or more surfactants.

In another embodiment, the concentrated pesticide composition forms a stable emulsion upon dilution with water. The stable pesticide composition provides deposition control benefits for pesticide spray solutions. If included, the optional hydrotrope component of the concentrated pesticide composition is typically present in an amount of up to about 25 pbw, more typically from about 2 to about 10 pbw, of the one or more hydrotropes per 100 pbw of the concentrated pesticide composition.

If included, the optional surfactant component of the concentrated pesticide composition is typically present in an amount of up to about 30 pbw, more typically from about 0.1 to about 5 pbw, of the one or more surfactants per 100 pbw of the concentrated pesticide composition.

In one embodiment, the concentrated pesticide composition comprises one or more pesticide compounds and a fatty deposition control agent comprising one or more fatty acids.

In one embodiment, the concentrated pesticide composition comprises one or more pesticide compounds, a fatty deposition control agent comprising one or more fatty acids and one or more polyalkoxylated triglyceride surfactants.

In one embodiment, the concentrated pesticide composition comprises one or more pesticide compounds, a fatty deposition control agent that comprises one or more fatty glycerides, more typically one or more vegetable oils, and one or more surfactants selected from fatty acid glycol ester surfactants and alkoxylated fatty alcohol surfactants.

In one embodiment, the concentrated pesticide composition comprises one or more pesticide compounds, a fatty deposition control agent comprising one or more fatty amines and one or more fatty amine ethoxylate surfactants.

In one embodiment, the concentrated pesticide composition comprises one or more pesticide compounds, a fatty deposition control agent comprising one or more fatty acid esters and one or more surfactants selected from alkoxylated alcohol surfactants. acid esters and one or more surfactants selected from alkoxylated alcohol surfactants.

In one embodiment, the concentrated pesticide composition as described herein does not comprise more than 0.5 pbw per 100 pbw of the composition, more typically does not comprise more than 0.05 pbw per 100 pbw of the composition, of any polymeric deposition control agent, such as a polysaccharide deposition control agent, and even more typically does not comprise any polymeric deposition control agent.

In one embodiment, the concentrated pesticide composition as described herein comprises the surfactant deposition control agent as the sole deposition control agent of the composition.

The concentrated pesticide composition as described herein exhibits good stability and handling properties, including low viscosity, and can be readily diluted with water to form efficacious aqueous end use pesticide compositions that may be spray applied to target pests and/or the environment of the target pests.

In one embodiment, the present invention is directed to a method for controlling deposition of a spray applied aqueous pesticide composition, comprising:
  (a) providing a concentrated pesticide composition comprising one or more pesticide compounds,
  (b) diluting the concentrated pesticide composition with an aqueous diluent, more typically with water, to provide a diluted pesticide composition,
  (c) incorporating in the concentrated pesticide composition and/or the diluted pesticide composition at least one fatty deposition control agent in an amount effective as a deposition control agent in the diluted pesticide composition, and
  (d) spray applying the diluted pesticide composition to the target pest and/or to the environment of the target pest.

In one embodiment, the concentrated pesticide composition can form a stable emulsion upon dilution with water. The stable pesticide composition provides deposition control benefits for pesticide spray solutions. Suitable aqueous diluents comprise water and may optionally further comprise one or more water miscible organic liquids, such as, for example, $(C_1-C_3)$alkanols, for example, methanol, ethanol, or propanol, $(C_1-C_3)$glycols, for example, ethylene glycol, or propylene glycol, and/or alkylether diols, for example, ethylene glycol monoethyl ether, propylene glycol monoethyl ether and diethylene glycol monomethyl ether. Most typically, the aqueous diluent is water.

In one embodiment, the end use pesticide composition as described herein is made by combining the adjuvant composition as described herein, a pesticide, and an aqueous medium, typically water.

In one embodiment, the end use pesticide composition as described herein is made by diluting the concentrated pesticide composition with aqueous medium, typically water, typically with from 1 to 10,000 gm of the aqueous medium per 1 gm of concentrated pesticide composition.

In one embodiment, the end use pesticide composition comprises, based on 100 pbw of the end use pesticide composition, an aqueous medium,
from greater than 0 to about 20 pbw of the one or more pesticide compounds,
from greater than 0, more typically from 0.01 pbw, even more typically from 0.05 pbw, and still more typically from 0.1 pbw of the fatty deposition control agent to 10 pbw, more typically to 2 pbw, even more typically to 0.5 pbw of the fatty deposition control agent,
optionally one or more hydrotropes, and
optionally, one or more surfactants.

In another embodiment, the concentrated pesticide composition forms a stable emulsion upon dilution with water. The stable pesticide composition provides deposition control benefits for pesticide spray solutions. If included, the optional hydrotrope component of the end use pesticide composition is typically present in an amount of up to about 5 pbw, more typically from about 0.05 to about 0.25 pbw, of the one or more hydrotropes per 100 pbw of the end use pesticide composition.

If included, the optional surfactant component of the end use pesticide composition is typically present in an amount of up to about 3 pbw, more typically from about 0.01 to about 0.1 pbw, of the one or more surfactants per 100 pbw of the end use pesticide composition.

In one embodiment, the end use pesticide composition does not comprise more than 0.5 pbw per 100 pbw of the composition, more typically does not comprise more than 0.05 pbw per 100 pbw of the composition, of any polymeric deposition control agent, such as a polysaccharide deposition control agent, and even more typically does not comprise any polymeric deposition control agent.

In one embodiment, the end use pesticide composition comprises the surfactant deposition control agent as the sole deposition control agent of the composition.

In one embodiment, the end use pesticide composition comprises an aqueous medium, one or more pesticide compounds, a fatty deposition control agent comprising one or more fatty acids or fatty acid esters and one or more polyalkoxylated triglyceride surfactants.

In one embodiment, the end use pesticide composition comprises an aqueous medium, one or more pesticide compounds, a fatty deposition control agent that comprises one or more fatty glycerides, more typically one or more vegetable oils, and one or more surfactants selected from fatty acid glycol ester surfactants.

In one embodiment, the adjuvant composition comprises an aqueous medium, one or more pesticide compounds, a fatty deposition control agent comprising one or more fatty amines and one or more fatty amine ethoxylate surfactants.

In one embodiment, the end use pesticide composition comprises one or more pesticide compounds, a fatty deposition control agent comprising one or more fatty acid esters, and one or more surfactants selected from alkoxylated alcohol surfactants.

In one embodiment of the adjuvant, concentrated pesticide composition, and end use pesticide compositions as described herein wherein the fatty deposition control agent comprises a fatty acid ester and the respective compositions each comprise a surfactant, the surfactant consists of one or more alkoxylated alcohol surfactants.

In one embodiment of the adjuvant, concentrated pesticide composition, and end use pesticide compositions as described herein wherein the fatty deposition control agent comprises a vegetable oil and the respective compositions each comprise a surfactant, the surfactant does not comprise any oleyl alcohol 5 mole ethoxylate surfactant, and more typically does not comprise any alkoxylated oleyl alcohol surfactant.

In one embodiment of the adjuvant composition, concentrated pesticide composition, and end use pesticide composition as described herein, the fatty deposition control agent is not encapsulated within a water insoluble capsule.

In one embodiment, the adjuvant composition, concentrated pesticide composition and/or end use pesticide composition further comprises a fertilizer. Such fertilizers can provide the primary nutrients of nitrogen, phosphorus and/or potassium such as urea ammonium nitrate (30-0-0), 10-34-0, secondary nutrients sulfur, calcium, magnesium such as ammonium thiosulfate 12-0-0-26S, micronutrient fertilizers containing zinc, iron, molybdenum, copper, boron, chlorine, magnesium, for example, 0-0-1 3%-S; 3%-Zn; 2%-Fe; 2%-Mn and mixtures thereof. In one embodiment, the end use pesticide composition comprises from about 85 to about 99 pbw, more typically from about 90 to about 99 pbw, and even more typically from about 93 to about 99 pbw, of a mixture of fertilizer and water.

In one embodiment, the concentrated pesticide composition and/or end use pesticide composition as described herein further comprises one or more water conditioners, such as for example, chelating agents, such as ethylenediamine tetraacetic acid, complexing agents such as ammonium sulfate, and pH adjusting agents, such as citric acid and polyacrylic acid or other ingredients, such as for example, one or more thickeners, such as polysaccharide thickeners, and polyacrylamide thickeners, as well as dyes, stabilizers, fragrances, antifoams, spreaders, and freeze point depressants.

In one embodiment, the end use pesticide composition as described herein comprises, based on 100 pbw of such composition, from about 0.1 to about 5 pbw, more typically from about 0.7 to about 2.5 pbw, of one or more water conditioners, typically ammonium sulfate.

In one embodiment, the end use pesticide composition as described herein is applied to foliage of one or more target plants at a rate, expressed in terms of the above described concentrated pesticide composition embodiment of the pesticide composition as described herein, of from about 0.01 pint, more typically about 0.5 pint, to about 20 pints, even more typically from about 1 pint to about 4 pints per acre.

In one embodiment, the end use pesticide composition as described herein is spray applied, typically via conventional spray apparatus, to foliage of one or more target plants present on an area of ground at a rate of from about 1 gallon to about 100 gallons, more typically about 3 gallons to 20 gallons, of the end use pesticide composition per acre of such area of ground.

In one embodiment, the spray applied end use pesticide composition comprising the fatty deposition control agent, typically a fatty drift control agent, exhibits a droplet size distribution wherein the volume percentage of droplets having a droplet size of less than 150 μm is reduced compared to an analogous spray applied end use pesticide composition that lacks the fatty deposition control agent, when the compositions are each spray applied under the same conditions. In one embodiment, volume percentage of droplets having a droplet size of less than 150 μm in the spray applied end use pesticide composition comprising the fatty deposition control agent at least 5%, or by at least 10%, or by at least 20%, or by at least 25%, smaller than volume percentage of droplets having a droplet size of less than 150 μm in the spray applied end use pesticide composition lacking the fatty deposition control agent, when the compositions are each spray applied through a TeeJet XR8002 flat fan nozzle at a pressure of 40 pounds per square inch ("psi"), and wherein the droplet distribution is measured at 30 centimeters below the nozzle tip.

In one embodiment, the end use composition comprises a herbicidally effective amount of pesticide that is effective to control one or more target plant species of one or more of the following genera: *Abutilon, Amaranthus, Artemisia, Asclepias, Avena, Axonopus, Borreria, Brachiaria, Brassica, Bromus, Chenopodium, Cirsium, Commelina, Convolvulus, Cynodon, Cyperus, Digitaria, Echinochloa, Eleusine, Elymus, Equisetum, Erodium, Helianthus, Imperata, Ipomoea, Kochia, Lolium, Malva, Oryza, Ottochloa, Panicum, Paspalum, Phalaris, Phragmites, Polygonum, Portulaca, Pteridium, Pueraria, Rubus, Salsola, Setaria, Sida, Sinapis, Sorghum, Triticum, Typha, Ulex, Xanthium* and *Zea*, including annual broadleaf species such as, for example, velvetleaf (*Abutilon theophrasti*), pigweed (*Amaranthus* spp.), buttonweed (*Borreria* spp.), oilseed rape, canola, indian mustard, etc. (*Brassica* spp.), *Commelina* (*Commelina* spp.), filaree (*Erodium* spp.), sunflower (*Helianthus* spp.), morning glory (*Ipomoea* spp.), *Kochia* (*Kochia scoparia*), mallow (*Malva* spp.), wild buckwheat, smartweed, etc. (*Polygonum* spp.), purslane (*Portulaca* spp.), russian thistle (*Salsola* spp.), *Sida* (*Sida* spp.), wild mustard (*Sinapis arvensis*) and cocklebur (*Xanthium* spp.), annual narrowleaf species such as for example, wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine indica*), annual ryegrass (*Lolium multiflorum*), rice (*Oryza sativa*), *Ottochloa* (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*), perennial broadleaf species such as, for example, mugwort (*Artemisia* spp.), milkweed (*Asclepias* spp.), canada thistle (*Cirsium arvense*), field bindweed (*Convolvulus arvensis*) and kudzu (*Pueraria* spp.), perennial narrowleaf species such as for example, *Brachiaria* (*Brachiaria* spp.), bermudagrass (*Cynodon dactylon*), yellow nutsedge (*Cyperus esculentus*), purple nutsedge (*C. rotundus*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (*Typha* spp.), and other perennial species such as, for example, horsetail (*Equisetum* spp.), bracken (*Pteridium aquilinum*), blackberry (*Rubus* spp.) and gorse (*Ulex europaeus*).

The fatty deposition control agent as described herein can also be used as an anti-misting or anti-drift additive in aqueous spray applied compositions other than spray applied end use pesticide compositions, such as, for example, personal care compositions, home care compositions, industrial spray coatings, ink jet printing inks, pressure washing compositions, spray drying applications, and fire extinguishing compositions.

Examples 1-A-1 and 1-A-2 and Comparative Example C1

Composition A was made by blending a first fatty deposition control agent (Canola oil, "Vegetable oil 1") and a first surfactant (an ethxoylated glycol ester of fatty acid, Alkamuls VO/2003, Rhodia Inc., "Surfactant 1"). The composition of Comparative Example C1 was made by blending a second fatty deposition control agent (Refined Rapeseed oil, "Vegetable oil 2") and a second surfactant (an ethoxylated (5 EO) oleyl alcohol, Rhodia Inc., "Surfactant 2"). The relative amount, in percent by weight (wt %), of each of the ingredients in each of the compositions is set forth in TABLE 1.

TABLE I

| Component | Amount A (wt %) | C1 (wt %) |
|---|---|---|
| Vegetable oil 1 | 85 | — |
| Vegetable oil 2 | — | 95 |
| Surfactant 1 | 15 | — |
| Surfactant 2 | — | 5 |

The aqueous spray compositions of Examples 1-A-1, and 1-A-2 and Comparative Examples C1-1 and C1-2 were made by diluting compositions A and C1 in distilled water to provide dilute aqueous mixtures containing the relative amount of the respective compositions A or C1 shown, as percent by weight ("wt %") of the dilute composition, in TABLE II below. The dilute aqueous compositions thus obtained were sprayed through a single, stationary XR11002 flat fan nozzle (Teejet) with an output of 0.64 liter min$^{-1}$ at a pressure of 30 psi (~2 bar) in a flow-controlled hood (speed ~1.6 MPH) and the droplet size distribution was measured perpendicular to the plane of spray pattern and 35 cm below the nozzle tip. A HELOS VARIO particle size analyzer (Sympatec) was used to measure the spray droplets using a R7 lens. The volume mean diameter ("VMD") of the spray droplets, expressed in micrometers ("µm"), and relative amount, expressed as percent by volume of the total spray volume ("vol %"), of droplets below 100 µm in size are given in TABLE II below for each composition. The spray compositions of Examples 1-A-1 and 1-A-2 exhibited a smaller amount of small size spray droplets that are very susceptible to spray drift, i.e., droplets below 100 µm in size, compared to respective analogous compositions of Comparative Examples C1-1 and C1-2.

TABLE II

| Example # | Amount of composition A or C1 in dilute aqueous mixture (wt %) | VMD (µm) | Droplet size <100 µm (vol %) |
|---|---|---|---|
| Water only | 0 | 144 | 29.4 |
| C. Ex. C1-1 | 0.25 wt % C1 | 173 | 20.8 |
| Ex. 1-A-1 | 0.25 wt % A | 182 | 17.6 |
| C. Ex. C1-2 | 1.0 wt % C1 | 185 | 18.4 |
| Ex. 1-A-2 | 1.0 wt % A | 201 | 15.9 |

Examples 2-A-1 and 2-A-2 and Comparative Example C2

The aqueous spray compositions of Example 2-A-1 and 2-A-2 were made by diluting composition A, as described above in regard to Example 1, in CIPAC water of hardness 340 parts per million and mixing the diluted composition A with an aqueous concentrate of glyphosate potassium salt (Roundup Powermax™, Monsanto) to provide aqueous end use pesticide compositions containing 2.25 wt % glyphosate potassium salt and the respective relative amount of the composition A shown, as percent by weight ("wt %") of the end use composition, in TABLE III below. The composition of Comparative Example C2 was a 2.25 wt % solution of the glyphosate potassium salt analogous to the compositions of Example 2-1 and 2-2, except that Comparative Example C2 lacked the deposition control agent and surfactant components of composition A. The aqueous compositions thus obtained were each sprayed through a single, stationary XR8002 flat fan nozzle or a AIXR11002 Air Induction nozzle (Teejet) at a pressure of 40 psi in a flow-controlled hood (speed ~1.6 MPH) and the droplet size distribution was measured perpendicular to the plane of spray pattern and 30 cm below the nozzle tip. A HELOS VARIO particle size analyzer (Sympatec) was used to measure the spray droplets using a R7 lens. The relative amount of droplets of less than 150 µm in size, relative amount of droplets of from 150 to 500 µm in size, and relative amount of droplets greater than 150 µm in size, each expressed as percent by volume of the total spray volume ("vol %"), are given in TABLE III below for each composition. The spray compositions of Examples 2-A-1 and 2-A-2 each exhibited a smaller amount of small spray droplets that are susceptible to spray drift, i.e., spray droplet of less than 150 microns in size, and a larger amount droplets within the desirable 150 µm to 500 µm size range compared to the composition of Comparative Example 2.

TABLE III

| Nozzle | Example # | Amount of composition A in end use composition (wt %) | Droplet size <150 µm (vol %) | Droplet size 150-500 µm (vol %) | Droplet size >500 µm (vol %) |
|---|---|---|---|---|---|
| XR8002 | C. Ex. C2 | 0 | 58.3 | 41.2 | 0.5 |
| | Ex. 2-A-1 | 0.3 wt % A | 34.8 | 64.3 | 0.9 |
| | Ex. 2-A-2 | 0.5 wt % A | 34.3 | 64.6 | 1.1 |
| AIXR11002 | C. Ex. C2 | 0 | 26.7 | 65.3 | 8.0 |
| | Ex. 2-A-1 | 0.3 wt % A | 11.2 | 71.2 | 17.6 |

Examples 3-A-1 and 3-A-2 and Comparative Example C3

The aqueous spray compositions of Examples 3-A-1 and 3-A-2 were made by diluting composition A, as described above in regard to Example 1, in CIPAC water of hardness 340 parts per million and mixing the diluted composition A with an aqueous concentrate of glyphosate potassium salt (Roundup Powermax™ Monsanto) and an aqueous 40 wt % solution of ammonium sulfate to provide aqueous end use pesticide compositions containing 2.25 wt % glyphosate potassium salt, 2 wt % of ammonium sulfate salt and the respective relative amount of the composition A shown, as percent by weight ("wt %") of the end use composition, in Table IV below. The composition of Comparative Example C3-1 was a solution of 2.25 wt % glyphosate potassium salt and 2 wt % ammonium sulfate that was analogous to Example 3-A-1 and 3-A-2, except that Comparative Example C3-1 lacked the deposition control agent and surfactant components of composition A. The aqueous solutions thus obtained were sprayed and their respective droplet size distribution were measured under the conditions described above in regard to Examples 2-A-1 and 2-A-2 and Comparative Example C2-1. The relative amount of droplets of less than 150 mm in size, relative amount of droplets of from 150 to 500 mm in size, and relative amount of droplets of greater than 150 mm in size, each expressed as percent by volume of the total spray volume ("vol %"), are each given in TABLE IV below for each composition. The spray compositions of Examples 3-A-1 and 3-A-2 each exhibited a smaller amount of small spray droplets that are susceptible to spray drift, i.e., spray droplet of less than 150 microns in size, and a larger amount droplets within the desirable 150 mm to 500 mm size range compared to the composition of Comparative Example C3-1.

TABLE IV

| Nozzle | Ex # | Amount of composition A or guar gum in end use composition (wt %) | Droplet of size <150 μm (vol %) | Droplet of size 150-500 μm (vol %) | Droplet of size >500 μm (vol %) |
|---|---|---|---|---|---|
| XR8002 | C. Ex. 3-1 | 0 | 60.1 | 39.3 | 0.6 |
|  | Ex. 3-A-1 | 0.3 wt % A | 34.4 | 64.6 | 1.0 |
|  | Ex. 3-A-2 | 0.5 wt % A | 34.1 | 65.0 | 0.9 |
| AIXR11002 | C. Ex. 3-1 | 0 | 28.8 | 64.8 | 6.4 |
|  | Ex. 3-A-1 | 0.3 wt % A | 10.7 | 72.7 | 16.6 |

Example 4

Compositions B, C, and D were made by blending a fatty deposition control agent (Soybean oil, "Vegetable oil 3") and a surfactant (poylethylene glycol ester of fatty acid, Alkamuls VO/2003, Rhodia Inc., "Surfactant 1") in the amounts shown in TABLE IV(a).

TABLE IV(a)

| Component | Amount | | |
|---|---|---|---|
|  | B (wt %) | C (wt %) | D (wt %) |
| Vegetable oil 3 | 90 | 85 | 80 |
| Surfactant 1 | 10 | 15 | 20 |

The aqueous spray compositions of Examples 4-B-1, 4-B-2, 4-C, and 4-D were made by diluting compositions B, C and D in CIPAC water of hardness 340 parts per million and mixing the respective diluted compositions B, C, and D with an aqueous concentrate of glyphosate potassium salt (Roundup Powermax™ Monsanto) and an aqueous 40 wt % solution of ammonium sulfate to provide aqueous end use pesticide compositions containing 2.25 wt % glyphosate potassium salt, 2 wt % of ammonium sulfate salt, and the respective relative amount of the composition B, C, or D shown, as percent by weight ("wt %") of the end use composition, in Table VI below. The composition of Comparative Example 4 was a solution of 2.25 wt % glyphosate potassium salt and 2 wt % ammonium sulfate that was analogous to the compositions of Examples 4-B-1, 4-B-2, 4-C, and 4-D, except that Comparative Example 4 lacked the deposition control agent and surfactant components of compositions B, C, and D. The aqueous solutions thus obtained were sprayed and their respective droplet size distributions were measured under the conditions described above in regard to Examples 2-A-1 and 2-A-2 and Comparative Example C2. The relative amount of droplets of less than 150 μm in size, relative amount of droplets of from 150 μm to 500 μm in size, and relative amount of droplets of greater than 150 μm in size, each expressed as percent by volume of the total spray volume ("vol %"), are given in TABLE V below for each composition. The compositions of Examples 4-B-1, 4-B-2, 4-C, and 4-D each exhibited a smaller amount of small spray droplets that are very susceptible to spray drift, i.e., spray droplet of less than 150 microns in size, compared to Comparative Example 4, without exhibiting a significant increase in the volume of undesirably large size droplets, i.e., droplets of greater than 500 μm in size.

TABLE V

| Nozzle | Ex # | Amount of composition B, C, or D in end use composition (wt %) | Droplet of size <150 μm (vol %) | Droplet of size 150-500 μm (vol %) | Droplet of size >500 μm (vol %) |
|---|---|---|---|---|---|
| XR8002 | C. Ex 4 | 0 | 60.1 | 39.3 | 0.6 |
|  | Ex. 4-B-1 | 0.5 wt % B | 38.7 | 60.8 | 0.5 |
|  | Ex. 4-C | 0.5 wt % C | 33.8 | 65.6 | 0.6 |
|  | Ex. 4-D | 0.5 wt % D | 37.3 | 62.1 | 0.6 |
| AIXR11002 | C. Ex 4 | 0 | 28.8 | 64.8 | 6.4 |
|  | Ex. 4-B-2 | 0.3 wt % B | 10.1 | 72.4 | 17.5 |
|  | Ex. 4-B-1 | 0.5 wt % B | 8.3 | 72.2 | 19.5 |

Examples 5, 6-F-1, 6-F-2 7-F-1 and 7-F-2, and Comparative Examples 5, 6, and 7

The compositions of formulations E and F were prepared by blending a fatty deposition control agent (either dimethyldodecylamine or tall oil fatty acid), and either an ethoxylated fatty amine surfactant (Rhodameen PN-430, Rhodia Inc., "Surfactant 3") or an ethoxylated castor oil surfactant (Alkamuls OR/36, Rhodia Inc., "Surfactant 4") in the relative amounts given in TABLE VI below.

TABLE VI

| Component | Amount E (wt %) | F (wt %) |
|---|---|---|
| Dimethyldodecylamine | 80 | 0 |
| Tall Oil Fatty Acid | 0 | 90 |
| Surfactant 3 | 20 | 0 |
| Surfactant 4 | 0 | 10 |

The aqueous spray composition of Example 5 was made by diluting composition E in distilled water to provide a dilute aqueous mixture containing the relative amount of the composition E shown, as percent by weight ("wt %") of the dilute composition, in TABLE VII below. Comparative Example C5 contained water only. The aqueous compositions thus obtained were sprayed through a single, stationary XR8002 flat fan nozzle at a pressure of 40 psi in a flow-controlled hood (speed ~1.6 MPH) and the droplet size distribution was measured perpendicular to the plane of spray pattern and 15 cm below the nozzle tip. A HELOS VARIO particle size analyzer (Sympatec) was used to measure the spray droplets using a R7 lens. The relative amount of droplets of less than 150 μm in size, expressed as percent by volume of the total spray volume ("vol %"), for each of the compositions are shown in TABLE VIII below. The Composition of Example 5 exhibited a smaller amount of small droplets that are very susceptible to spray drift, i.e., droplets of less 150 μm in size, compared to the composition of Comparative Example C5.

TABLE VII

| Example # | Amount of composition E in end use composition (wt %) | Droplet of size <150 μm (Volume %) |
|---|---|---|
| C. Ex. 5 | 0 | 43.5 |
| Ex. 5-E | 0.3 wt % E | 19.0 |

The aqueous spray compositions of Examples 6-F-1 and 6-F-2 were by diluting composition F in CIPAC water of hardness 340 parts per million and mixing the diluted composition F with an aqueous concentrate of glyphosate potassium salt (Roundup Powermax™, Monsanto) to provide aqueous end use pesticide compositions containing 2.25 wt % glyphosate potassium salt and the respective relative amount of the composition F shown, as percent by weight ("wt %") of the end use composition, in TABLE VIII below. The composition of Comparative Example C6 was a solution of 2.25 wt % glyphosate potassium salt that was analogous to the compositions of Examples 6-F-1 and 5-F-2, except that Comparative Example C6 lacked the deposition control agent and surfactant of composition F. The aqueous solutions thus obtained were sprayed and their respective droplet size distribution were measured under the conditions described above in regard to Examples 2-A-1 and 2-A-2 and Comparative Example C2. The relative amount of droplets of less than 150 μm in size, relative amount of droplets of from 150 μm to 500 μm in size, and relative amount of droplets of greater than 150 μm in size, each expressed as percent by volume of the total spray volume ("vol %"), are given in TABLE VIII below for each composition. The composition of Examples 6-F-1 and 6-F-2 each exhibited a smaller amount of small size spray droplets that are very susceptible to spray drift, i.e., droplets of less than 150 microns in size, compared to Comparative Example C6, without exhibiting a significant increase in the volume of undesirably large spray droplets, i.e., droplets of greater than 500 μm in size.

TABLE VIII

| Nozzle | Example # | Amount of composition A or F in end use composition (wt %) | Droplet size <150 μm (vol %) | Droplet size 150-500 μm (vol %) | Droplet size >500 μm (vol %) |
|---|---|---|---|---|---|
| XR8002 | C. Ex. 6 | 0 | 58.3 | 41.2 | 0.5 |
|  | Ex. 6-F-1 | 0.3 wt % F | 31.8 | 67.8 | 0.4 |
|  | Ex. 6-F-2 | 0.5 wt % F | 30.9 | 68.6 | 0.5 |

Examples 7-F-1 and 7-F-2 and Comparative Example C7

The aqueous spray compositions of Examples 7-F-1 and 7-F-2 were made by diluting composition F in CIPAC water of hardness 340 parts per million and mixing the diluted composition F with an aqueous concentrate of glyphosate potassium salt (Roundup Powermax™, Monsanto) and an aqueous 40 wt % solution of ammonium sulfate to provide aqueous end use pesticide compositions containing 2.25 wt % glyphosate potassium salt, 2 wt % of ammonium sulfate salt, and the respective relative amount of the composition F shown, as percent by weight ("wt %") of the end use composition, in Table IX below. The composition of Comparative Example C7 was a solution of 2.25 wt % glyphosate potassium salt and 2 wt % ammonium sulfate that was analogous to the compositions of Examples 7-F-1 and 7-F-2, except that Comparative Example C7 lacked the deposition control agent and surfactant of composition F. The aqueous solutions thus obtained were sprayed and their respective droplet size distribution were measured under the conditions described above in regard to Examples 2-A-1 and 2-A-2 and Comparative Example C2. The relative amount of droplets of less than 150 μm in size, the relative amount of droplets of from 150 to 500 μm in size, and the relative amount of droplets of greater than 150 μm in size, each expressed as percent by volume of the total spray volume ("vol %") are given in Table IX below for each composition. The compositions of Examples 7-F-1 and 7-F-2 each exhibited a smaller amount of small spray droplets that are very susceptible to spray drift, i.e., droplets of less than 150 microns in size, compared to the composition of Comparative Example C7, without exhibiting a significant increase in the volume of undesirably large droplets, i.e., droplets of greater than 500 μm in size.

TABLE IX

| Nozzle | Example # | Amount of composition F in end use composition (wt %) | Droplet size <150 μm (vol %) | Droplet size 150-500 μm (vol %) | Droplet size >500 μm (vol %) |
| --- | --- | --- | --- | --- | --- |
| XR8002 | C. Ex C7 | 0 | 60.1 | 39.3 | 0.6 |
|  | Ex. 7-F-1 | 0.3 wt % F | 32.8 | 66.8 | 0.4 |
|  | Ex. 7-F-2 | 0.5 wt % F | 32.8 | 66.9 | 0.3 |
| AIXR11002 | C. Ex C7 | 0 | 28.8 | 64.8 | 6.4 |
|  | Ex. 7-F-1 | 0.3 wt % F | 11.8 | 73.9 | 14.3 |

Examples 8-10

The composition of formulation G was prepared by blending a fatty deposition control agent (tall oil fatty acid), an ethoxylated castor oil surfactant (Alkamuls OR/36, Rhodia Inc., "Surfactant 4"), and an aqueous solution of a hydrotrope (40% aqueous solution of Sodium Xylene Sulfonate). The resultant mixture was homogeneous and clear. The composition of formulation H was prepared by blending tall oil fatty acid, Surfactant 4, and an aqueous pesticide solution of Glyphosate potassium salt (Roundup Powermax™). The amount of components in each composition is set forth in TABLE X below.

TABLE X

|  | Amount (wt %) | |
| --- | --- | --- |
| Component | G | H |
| Tall Oil Fatty Acid | 9 | 9 |
| Surfactant 4 | 1 | 1 |
| Aqueous hydrotrope (40% aqueous solution of Sodium Xylene Sulfonate) | 90 | — |
| Aqueous glyphosate potassium salt (Roundup Powermax ™) | — | 90 |

The aqueous composition of Example 8 was made by diluting composition G in the CIPAC water and mixing the diluted composition G with an aqueous concentrate of glyphosate potassium salt (Roundup Powermax™, Monsanto) to provide aqueous end use pesticide compositions containing 2.25 wt % glyphosate potassium salt and the relative amount of the composition G shown, as percent by weight ("wt %") of the end use composition, in Table XI below. The composition of Example 9 was made by diluting composition H in the CIPAC water. The aqueous composition of Example 10 was made by diluting composition H with CIPAC water and mixing the diluted composition H with an aqueous 40 wt % solution of ammonium sulfate to provide aqueous end use pesticide compositions containing 2 wt % of ammonium sulfate salt, and the relative amount of the composition H shown, as percent by weight ("wt %") of the end use composition, in Table XI below. The composition of Comparative Example C8 was analogous to the composition of Example 8, except that it lacked the fatty deposition control agent and surfactant components of composition G. The composition of Comparative Example C9 was made by mixing an aqueous concentrate of glyphosate potassium salt (Roundup Powermax™, Monsanto) and an aqueous 40 wt % solution of ammonium sulfate to provide aqueous end use pesticide compositions containing 2.25 wt % glyphosate potassium salt, 2 wt % of ammonium sulfate salt, but lacking the fatty deposition control agent and surfactant components of composition G. The aqueous spray compositions of Ex. 8-10 and Comparative Examples C8 and C9 were sprayed through a TeeJet XR8002 flat fan nozzle and their respective droplet size distribution were measured under the conditions described above in regard to Examples 3-A-1 and 3-A-2 and Comparative Example C3. The relative amount of droplets of less than 150 μm in size, relative amount of droplets of from 150 to 500 μm in size, and relative amount of droplets greater than 150 μm in size, each expressed as percent by volume of the total spray volume ("vol %"), are given in TABLE XI below for each composition. The compositions of Examples 8 and 10 each exhibited a smaller amount of small spray droplets that are very susceptible to spray drift, i.e., droplets of less than 150 microns in size, compared to the composition of Comparative Example C8 and C9, without exhibiting a significant increase in the volume of undesirably large droplets, i.e., droplets of greater than 500 μm in size.

TABLE XI

| Ex # | Amount of composition G or H in end use composition (wt %) | Droplet size <150 μm (vol %) | Droplet size 150-500 μm (vol %) | Droplet size >500 μm (vol %) |
| --- | --- | --- | --- | --- |
| C. Ex. C8 | aqueous 2.25 wt % glyphosate potassium salt | 58.3 | 41.2 | 0.5 |
| C. Ex. C9 | aqueous 2.25 wt % glyphosate potassium salt + 2 wt % ammonium sulfate | 60.1 | 39.3 | 0.6 |
| Ex. 8 | 2.25 wt % composition G + 2.25 wt % glyphosate potassium salt | 31.8 | 67.9 | 0.3 |
| Ex. 9 | 2.25 wt % composition H | 30.1 | 69.3 | 0.7 |
| Ex. 10 | 2.25 wt % composition H + 2 wt % ammonium sulfate | 30.3 | 69.2 | 0.6 |

Example 11 and Comparative Example C11

Composition I was made by blending a fatty deposition control agent (methyl laurate) and a first surfactant (alcohol ethoxylate (Rhodasurf LA30, Rhodia Inc., "Surfactant 5"). Composition J was made by blending a second fatty deposition control agent (rapeseed oil ester) and a second surfactant (ethoxylated (5 EO) oleyl alcohol, Rhodia Inc., "Surfactant 2"). The amount of components in each composition is set forth in Table XII, below.

TABLE XII

| | Amount (wt %) | |
|---|---|---|
| Component | I | J |
| methyl laurate | 97 | — |
| Rapeseed oil ester | — | 95 |
| Surfactant 2 | — | 5 |
| Surfactant 5 | 3 | — |

The aqueous spray composition of Example 11 was prepared by diluting composition I in distilled water in the amount shown in Table XIII. Composition of comparative example C10 was water only. Comparative Example C11 was prepared by diluting composition J in distilled water in the amount shown in Table XIII. The aqueous spray compositions of Ex. 11 and Comparative Examples C10 and C11 were each sprayed and their respective droplet size distributions were measured under the conditions described above in regard to Examples 1-A-1 and 1-A-2 and Comparative Example C1. The relative amount, expressed as percent by volume of the total spray volume ("vol %"), of droplets below 100 μm in size are given in TABLE XIII below for each composition. The spray compositions of Example 11 exhibited a smaller amount of small size spray droplets that are very susceptible to spray drift, i.e., droplets below 100 μm in size, compared to respective compositions of Comparative Examples C10 and C11.

TABLE XIII

| Example # | Amount of composition I or J in end use composition (wt %) | Droplet size <100 μm (vol %) |
|---|---|---|
| C. Ex. C10 | Water only | 25.5 |
| C. Ex. C11 | 0.25 wt % J in water | 16.1 |
| Ex. 11 | 0.25 wt % I in water | 15.4 |

Example 12 and Comparative Example C12

The aqueous spray composition of Example 12 was prepared by mixing Composition A at 0.5 wt % in water. The composition of Comparative Example C12 was water only. The aqueous spray compositions of Example 12 and Comparative Example C12 were each tested and recorded using high speed videography (Phantom V211 camera to capture videos at 3000 frames per second). A single drop of diameter 2-2.5 mm was produced from a precision needle and allowed to fall on an inclined 45 degrees hydrophobic substrate (parafilm) 5 ft below the tip of the needle. It was generally observed that when the drop impacted the surface it spread across to reach its maximum diameter then recoiled under the action of surface tension, and either remained on the surface or rebounded off the surface and/or rolled down the substrate surface. It was observed that the droplet of Comparative Example C12 retracted/rebounded and eventually rolled off the parafilm substrate. Under a similar time-frame, it was observed that the droplet of Composition A exhibited limited rebound. It was also observed that Composition A did not roll off similar to Comparative Example C12. Thus, Composition A exhibited anti-rebound properties in a lower amount of rebound and roll off, which would lead to increasing deposition properties of agrochemical spray solutions.

Example 12-A, 12-F and Comparative Example C12

The aqueous spray composition of Example 12-A was prepared by mixing Composition A at 0.3 wt % in water. The aqueous spray composition of Example 12-F was prepared by mixing Composition F at 0.3 wt % in water. The composition of Comparative Example C12 was water only. The aqueous spray compositions of Example 12-A, 12-F and Comparative Example C12 were each tested and recorded using high speed videography (Phantom V211 camera to capture videos at 3000 frames per second). A single drop of diameter 2-2.5 mm was produced from a precision needle and allowed to fall on an inclined 45 degrees hydrophobic substrate (parafilm) 5 ft below the tip of the needle. It was generally observed that when the drop impacted the surface it spread across to reach its maximum diameter then recoiled under the action of surface tension, and either remained on the surface or rebounded off the surface and/or rolled down the substrate surface. It was observed that the droplet of Comparative Example C12 retracted/rebounded and eventually rolled off the parafilm substrate. Under a similar time-frame, it was observed that the droplet of Composition 12-A and 12F exhibited limited rebound. It was also observed that Compositions 12-A and 12-F did not roll off similar to Comparative Example C12. Thus, Composition 12-A and 12-F exhibited anti-rebound properties in a lower amount of rebound and roll off, which would lead to increasing deposition properties of agrochemical spray solutions.

What is claimed is:

1. A method for improving deposition control of an aqueous pesticide composition during a spray application, comprising:
    contacting an aqueous pesticide composition with an adjuvant composition, wherein the adjuvant composition consists of, based on 100 parts by weight of the adjuvant composition:
    from 60 to 90 pbw of at least one fatty deposition control agent selected from the group consisting of canola oil and soybean oil, and
    from 10 to 40 pbw of at least one surfactant consisting of an ethoxylated glycol ester of fatty acid;
    wherein an end use pesticide composition comprises the aqueous pesticide composition and the adjuvant composition and wherein the end use pesticide composition comprises, based on 100 pbw of the end use pesticide composition:
    an aqueous medium,
    from greater than 0 to about 20 pbw of one or more pesticide compounds;
    from 0.1 to 10 pbw of the at least one fatty deposition control agent, wherein the at least one fatty deposition control agent comes from the adjuvant composition,
    optionally, one or more hydrotropes;
    and wherein the adjuvant composition forms a stable emulsion upon dilution into the pesticide composition; and spray applying the end use pesticide composition to a target pest and/or to the environment of the target pest, wherein the spray applying uses an air induction nozzle or a flat fan nozzle and wherein droplets comprising the aqueous pesticide composition and the adjuvant composition have greater than 60% of the droplets in the 150 to 500 pm range exiting the nozzle when the flat fan nozzle is used and greater than 70% of the droplets in the 150 to 500 pm range exiting the nozzle when the air induction nozzle is used, wherein the spray applied end use pesticide composition exhibits improved deposition control compared to the aqueous pesticide composition when spray applied.

2. The method of claim 1, wherein the at least one fatty deposition control agent is present at least at 80 wt % of the adjuvant composition and the at least one surfactant is present at least at 15 wt % of the adjuvant composition.

3. The method of claim 1, wherein the pesticide comprises one or more herbicide compounds selected from glyphosate, its water soluble salts and esters, and mixtures thereof.

4. The method of claim 1, wherein the at least one fatty deposition control agent is present at least at 80 wt % of the adjuvant composition.

5. The method of claim 1, wherein the at least one surfactant is present at least at 15 wt % of the adjuvant composition.

6. The method of claim 1, wherein the spray applied end use pesticide composition exhibits improved drift control properties compared to the aqueous pesticide composition when spray applied.

7. The method of claim 1, wherein the spray applied end use pesticide composition exhibits improved anti-rebound properties compared to the aqueous pesticide composition when spray applied.

8. The method of claim 1, wherein the at least one fatty deposition control agent consists of canola oil.

9. The method of claim 1, wherein the at least one fatty deposition control agent consists of soybean oil.

10. The method of claim 1, wherein the at least one fatty deposition control agent consists of canola oil and soybean oil.

11. A method for improving deposition control of an aqueous pesticide composition during a spray application, comprising:
  contacting an aqueous pesticide composition with an adjuvant composition, wherein the adjuvant composition consists of, based on 100 parts by weight of the adjuvant composition:
  from 60 to 90 pbw of at least one fatty deposition control agent selected from the group consisting of canola oil and soybean oil,
  and from 10 to 40 pbw of at least one surfactant consisting of an ethoxylated glycol ester of fatty acid;
  wherein an end use pesticide composition comprises the aqueous pesticide composition and the adjuvant composition and wherein the end use pesticide composition comprises, based on 100 pbw of the end use pesticide composition:
  an aqueous medium,
  from greater than 0 to about 20 pbw of one or more pesticide compounds;
  from 0.1 to 10 pbw of the at least one fatty deposition control agent, wherein the at least one fatty deposition control agent consists of the at least one fatty deposition control agent from the adjuvant composition,
  optionally, one or more hydrotropes;
  and wherein the adjuvant composition forms a stable emulsion upon dilution into the pesticide composition; and
  spray applying the end use pesticide composition to a target pest and/or to the environment of the target pest, wherein the spray applying uses an air induction nozzle or a flat fan nozzle and wherein droplets comprising the aqueous pesticide composition and the adjuvant composition have greater than 60% of the droplets in the 150 to 500 pm range exiting the nozzle when the flat fan nozzle is used and greater than 70% of the droplets in the 150 to 500 pm range exiting the nozzle when the air induction nozzle is used,
  wherein the spray applied end use pesticide composition exhibits improved deposition control compared to the aqueous pesticide composition when spray applied.

* * * * *